United States Patent

[11] 3,611,098

| [72] | Inventors | Donald G. Fair<br>Belvidere;<br>Bertil T. Anderson, Rockford, both of Ill. |
|---|---|---|
| [21] | Appl. No. | 867,347 |
| [22] | Filed | Oct. 17, 1969 |
| [23] | | Division of Ser. No. 586,426, Oct. 13, 1966, which is a continuation-in-part of Ser. No. 478,701, Aug. 10, 1965, Pat. No. 3,453,523 |
| [45] | Patented | Oct. 5, 1971 |
| [73] | Assignee | Sundstrand Corporation |

| 3,328,606 | 6/1967 | Pinckaers | 307/252.73 |
|---|---|---|---|
| 3,418,560 | 12/1968 | Petersen | 318/356 |
| 3,435,329 | 3/1969 | Hunter | 318/345 |
| 3,488,521 | 1/1970 | Smith | 307/252.73 |
| 3,517,296 | 6/1970 | Kuhn | 321/5 |
| 3,486,102 | 12/1969 | Wilkerson | 321/5 |

Primary Examiner—Oris L. Rader
Assistant Examiner—Thomas Langer
Attorney—Hofgren, Wegner, Allen, Stellman & McCord

[54] CONTROL CIRCUIT FOR DC MOTOR AND GATABLE CONDUCTION DEVICES
56 Claims, 15 Drawing Figs.

[52] U.S. Cl. .................................................... 318/338,
321/5, 307/237, 321/11
[51] Int. Cl. ........................................................ H02p 7/06
[50] Field of Search .......................................... 318/327,
331, 345, 356, 291, 338; 321/5, 11, 20, 27;
307/237, 252.73

[56] References Cited
UNITED STATES PATENTS
3,283,234  11/1966  Dinger ........................ 307/252.73

ABSTRACT: A control circuit for energizing the armature and field of a DC motor from a three-phase AC source. Each phase of AC is coupled to a pair of reverse poled SCR's which pass up to 120° of the AC waveform, in either polarity, to the motor armature. For high motor speeds, the armature voltage is held constant while a field control circuit varies the magnitude of DC current to the motor field winding. A clamp safety circuit prevents the SCR's from being fired to brake the motor when back e.m.f. exceeds a predetermined level. A field cutoff safety circuit dissipates excessive back e.m.f. by shunting the motor field, without affecting the speed of rotation of the armature. Other safety circuits control the deceleration of the motor, insure that the SCR's for the motor armature turn off after energization, and cancel magnetic interaction between the armature and field.

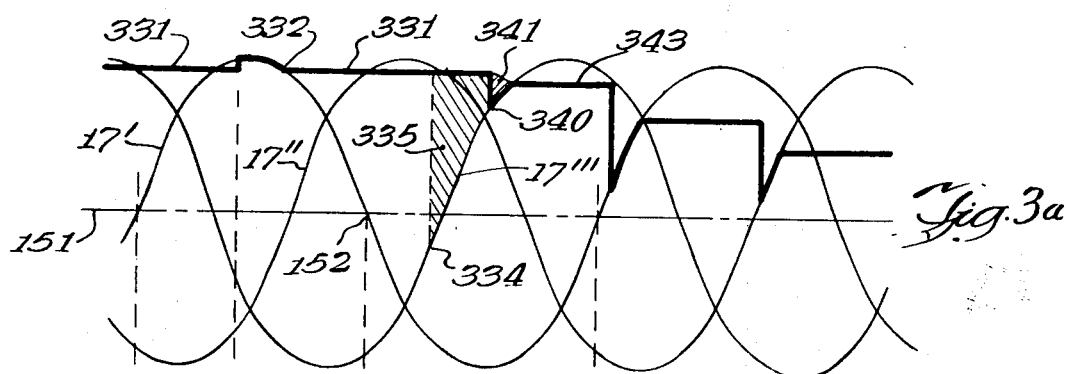
Fig. 3a
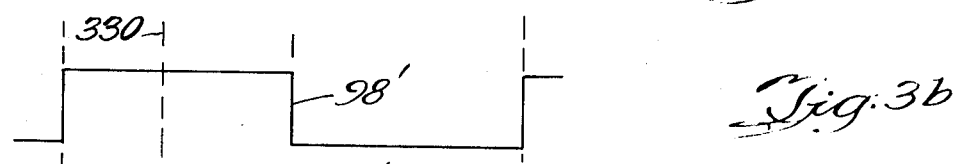
Fig. 3b
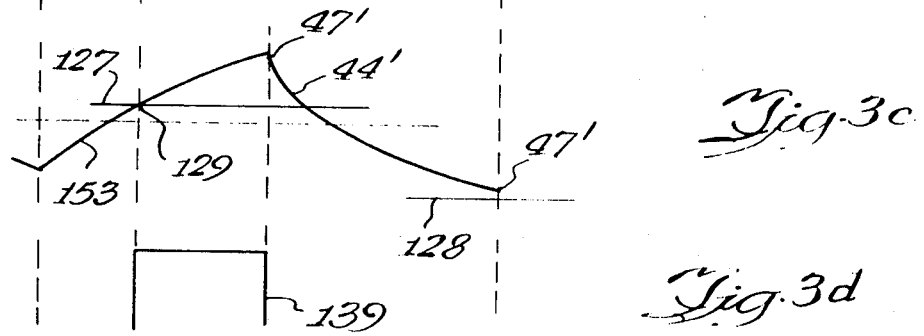
Fig. 3c
Fig. 3d
Fig. 8a
Fig. 8b
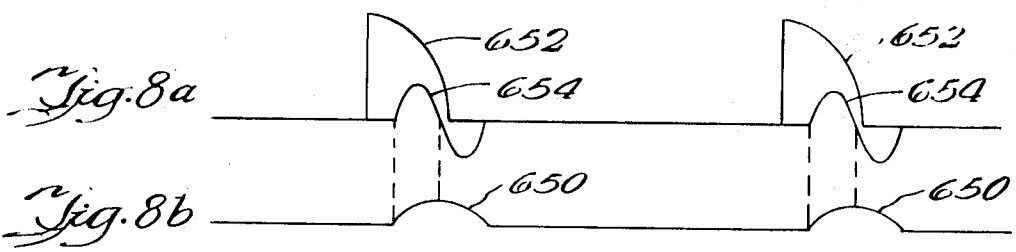
Fig. 9
Fig. 10
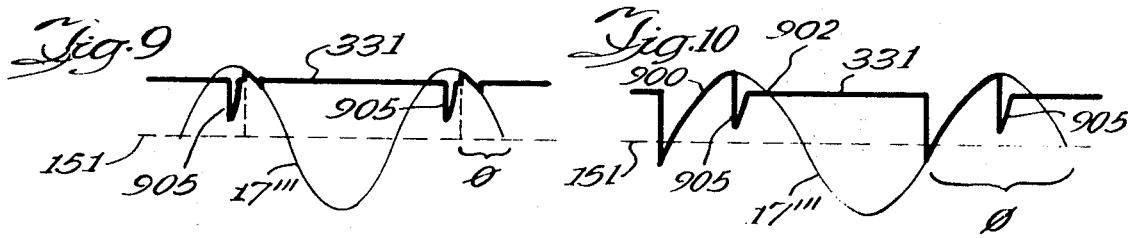
Fig. 7
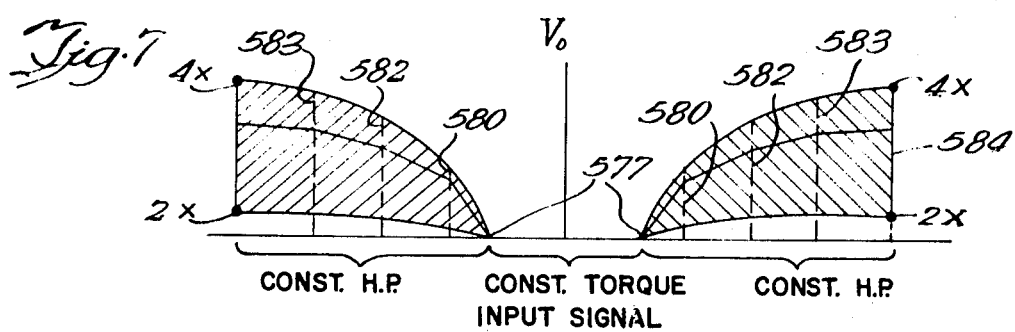
CONST. H.P.   CONST. TORQUE   CONST. H.P.
INPUT SIGNAL

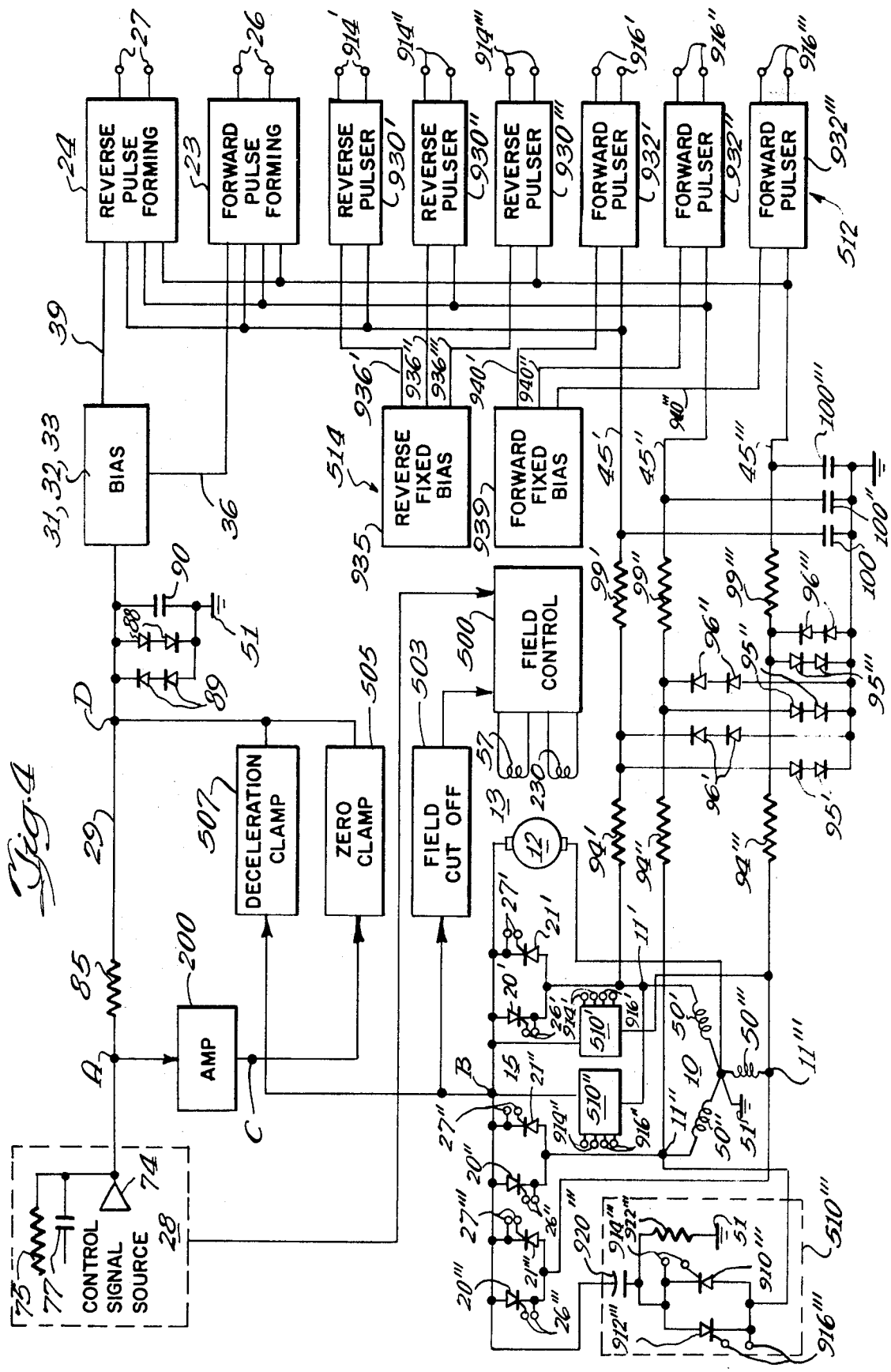

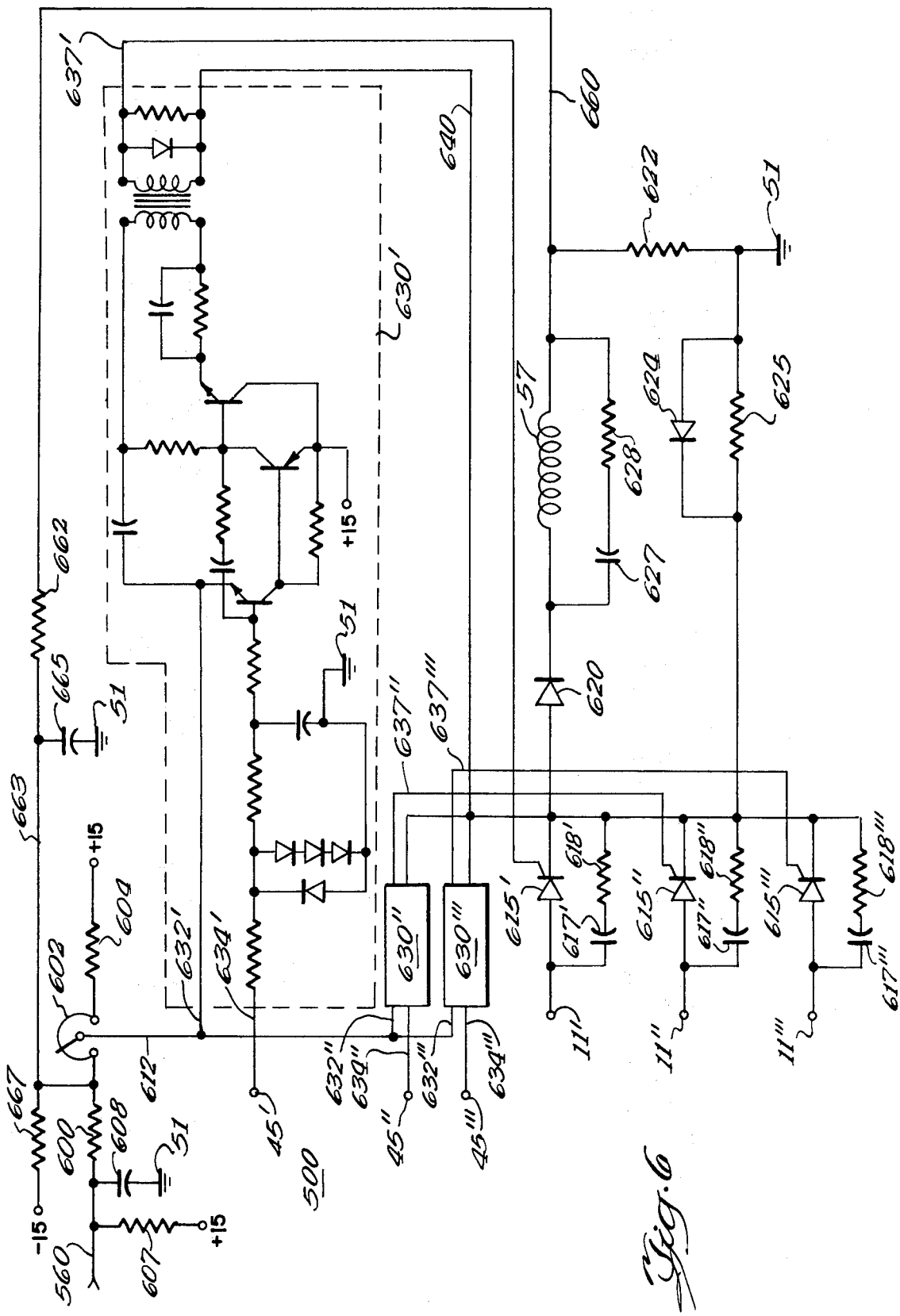

CONTROL CIRCUIT FOR DC MOTOR AND GATABLE CONDUCTION DEVICES

This application is a division and a continuation-in-part of application "Motor Control Circuit," Ser. No. 586,426, filed Oct. 13, 1966, which was a continuation-in-part of application "Motor Control Circuit," Ser. No. 478,701, filed Aug. 10, 1965, now U.S. Pat. No. 3,453,523, issued July 1, 1969, and entitled "Load Energizing Circuit Including Gating Means Controlled By Cross-Fire Signals and Ramp-Shaped Timing Signals."

This invention relates to a control circuit, and more particularly to a control circuit for a rotating electrical machine.

DC motors may be operated over a substantial range of speeds by controlling both the armature and the field of the motor in a known manner. Prior control circuits have energized a DC motor by connecting a three-phase AC wave source to the armature of the motor through controlled rectifiers, such as silicon controlled rectifiers (SCR's). The portion of the half-cycle of the AC wave passed by each SCR determines the DC terminal voltage across the armature, for controlling the motor at slower speeds. To control the DC motor at higher speeds, prior circuits have held the armature terminal voltage constant while varying the magnitude of DC current through the field winding.

When a DC motor is to decelerate quickly to a slower speed, or to a stop before reversing its direction of rotation, it is necessary to gate SCR's poled in the opposite current flow direction compared with the SCR's previously gated, in order to pass oppositely flowing unidirection current for braking the motor. Unfortunately, a rotating motor, unlike most other types of loads, generates a large amplitude back EMF voltage across the armature, which is opposite in polarity to the voltage normally gated by the SCR's. When the oppositely poled SCR's are fired for braking the motor, the back e.m.f. adds to the voltage gated in the braking direction, creating large current surges which violently decelerate the motor. These violent current surges can cause destruction of the motor itself, as well as to the connected load rotated by the motor. Furthermore, this violent deceleration condition becomes increasingly serious at higher motor speeds, which generate even higher amplitudes of back e.m.f.

In accordance with the applicants' invention, an armature and field control circuit interact to control a DC motor throughout a substantial range of speeds. This is accomplished by saturating the field and varying the armature terminal voltage at slow speeds, and maintaining the armature terminal voltage at the maximum allowable value and varying the field of the motor for higher speeds, which method of operation is known. The present invention, however, accomplishes this method of operation in a greatly improved manner. The armature control portion of the circuit generates trigger signals for firing controlled rectifiers connected between a three-phase AC power source and the armature of the motor. This portion of the circuit, absent the components which cause the interaction with the field control, is substantially that disclosed in our before identified application, Ser. No. 478,701.

The field control portion of the circuit gates a variable DC current to the field winding of the motor. The motor speed is changed by varying the field current to a new value corresponding to the desired speed. In addition, the control circuit incorporates a number of safety circuits which obviate the problems existing in prior motor control circuits due to the back e.m.f. For example, a phase back circuit determines when the motor is to decelerate, and is responsive thereto for modifying the operation of the armature control circuit. The firing point of the SCR's is shifted, causing substantially smaller braking current surges to be gated to the armature of the motor for smoother deceleration. A clamp circuit prevents the SCR's from being fired, braking the motor, when the back e.m.f. exceeds a predetermined high level. Another of the safety circuits allows excessive back e.m.f. to be smoothly and quickly dissipated by cutting off and shunting the field of the motor, without affecting the speed of rotation of the armature. The above described circuits are disclosed in our before identified application, Ser. No. 586,426.

Also, in accordance with the applicants' invention, additional circuits are disclosed which may supplement or replace various of the circuits described in our two before identified applications. An additional clamp circuit prevents the SCR's from being fired during certain conditions related to the deceleration of the motor. Thus, the clamp circuits may be used in addition to, or in place of the phase back circuit previously described. A circuit in the field control cancels the undesirable effects of magnetic interaction between the armature and the field, allowing the motor to accurately follow the input control signal. A portion of the armature control circuit insures that the SCR's for the motor armature turn off at the proper time, preventing the occurrence of a "rollover" condition which could destroy components in the control and/or the motor. Finally, an alternate circuit for the field control is disclosed, which can replace the field control circuit disclosed in our application Ser. No. 586,426. The alternate circuit uses a different type of generating means for generating absolute value signals.

The individual parts which form the overall control system include circuits which are useful in many applications, and are not limited to use in motor control systems. Furthermore, the various control and safety circuits may be used in different combinations depending upon the exact control operation to be performed.

One object of the invention is the provision of an improved control circuit capable of safely and efficiently operating a DC motor over a substantial range of speeds.

Another object of the invention is the provision of a motor control circuit incorporating safety circuits which obviate problems otherwise occurring due to the presence of back e.m.f. across a DC motor armature.

A further object of this invention is the provision of a motor control circuit responsive to a condition for maintaining a control signal at a minimum value, preventing the controlled rectifiers which are to pass braking current from being energized until the condition ceases. A feature of this circuit is that the condition may be a predetermined amplitude of back e.m.f., preventing energization of the controlled rectifiers until the excessive back e.m.f. drops to a safe level. Another feature of this circuit is that the condition may relate to factors concerned with deceleration of the motor, maintaining the control signal at one or more clamped values until the motor can further safely decelerate.

Yet another object of this invention is the provision of a motor control circuit which determines when the motor is to decelerate, and is responsive thereto for modifying the operation of the control circuit to cause the rotating motor to decelerate smoothly.

Still a further object of this invention is the provision of a control circuit which gates unidirectional current to the field coil of a motor, and which is responsive to an excessive amplitude of back e.m.f. across the motor armature for discontinuing current flow through the field coil and for shunting voltage which is generated in the field coil by the collapsing magnetic flux of the field, to dissipate the excessive e.m.f. smoothly.

Yet a further object of this invention is the provision of a control circuit for energizing each of a pair of parallel connected oppositely poled controlled rectifiers during each cycle of an AC signal, for passing similar parts of oppositely going portions of the AC signal. A feature of this circuit is that the rectifiers are controlled by a pair of signals of equal absolute magnitude and of opposite polarity. When the amplitude of a control signal changes, each of the pair of signals varies by the same absolute amount, to change the portion of the AC signal gated by each rectifier. Another feature of this circuit is that the control signal is bipolar, having positive and negative amplitudes, and the circuit generates therefrom a signal of absolute magnitude corresponding to the absolute magnitude of the bipolar control signal, and applies this absolute magnitude signal to a controlled rectifier so that a single rectifier passes similar parts of AC for control signals having equal absolute magnitudes but opposite polarities.

Still a further object of this invention is the provision of a completely transistorized motor control circuit for precisely controlling the armature and the field of a DC motor.

Yet a further object of this invention is the provision of a control circuit for cancelling the effects of magnetic interaction between the armature and the field of a DC motor.

Still a further object of this invention is the provision of a control circuit for energizing a load through a controlled rectifier coupled to a source of AC signal, and which includes means for insuring that the controlled rectifier is turned off after energization, preventing the occurrence of a "rollover" condition. Such a control circuit is especially useful wherein the load is a motor or other load having a substantial inductance.

Further features and advantages will readily be apparent from the following specification and from the drawings, in which.

Figure 1:
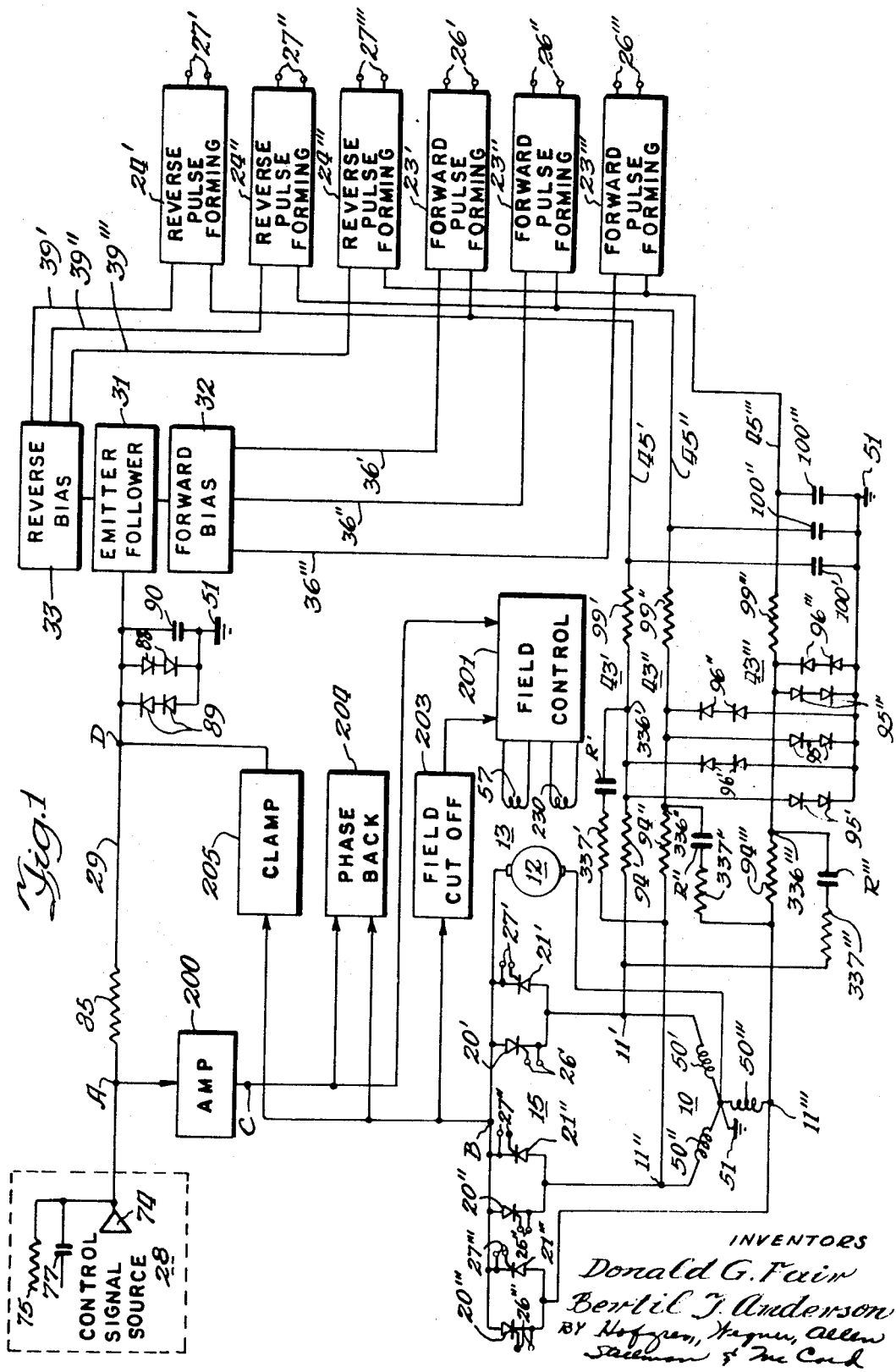
FIG. 1 is a circuit diagram of an embodiment of the invention, partly in block form and partly in schematic form.
Figure 5:
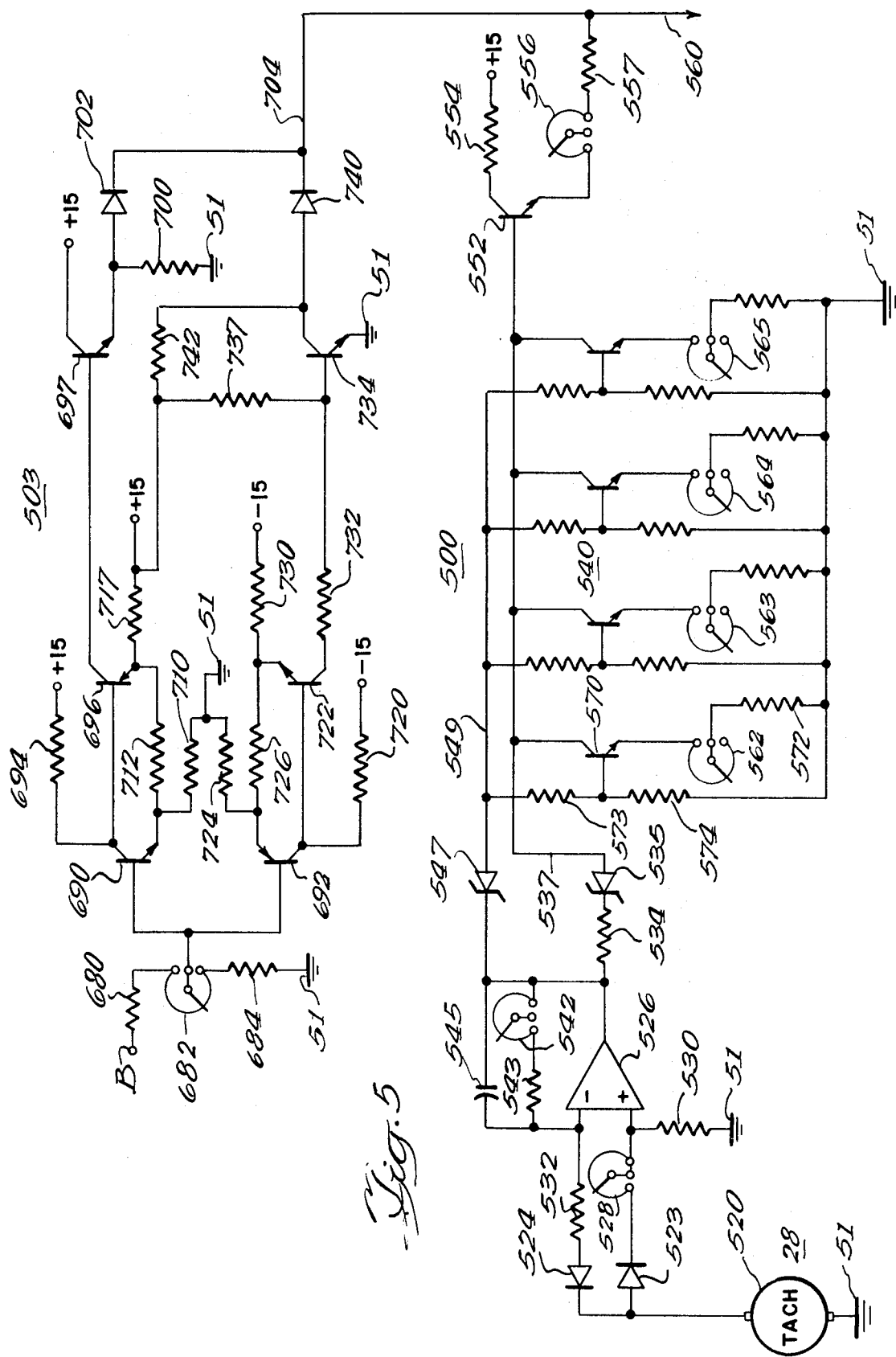
Figure 11:
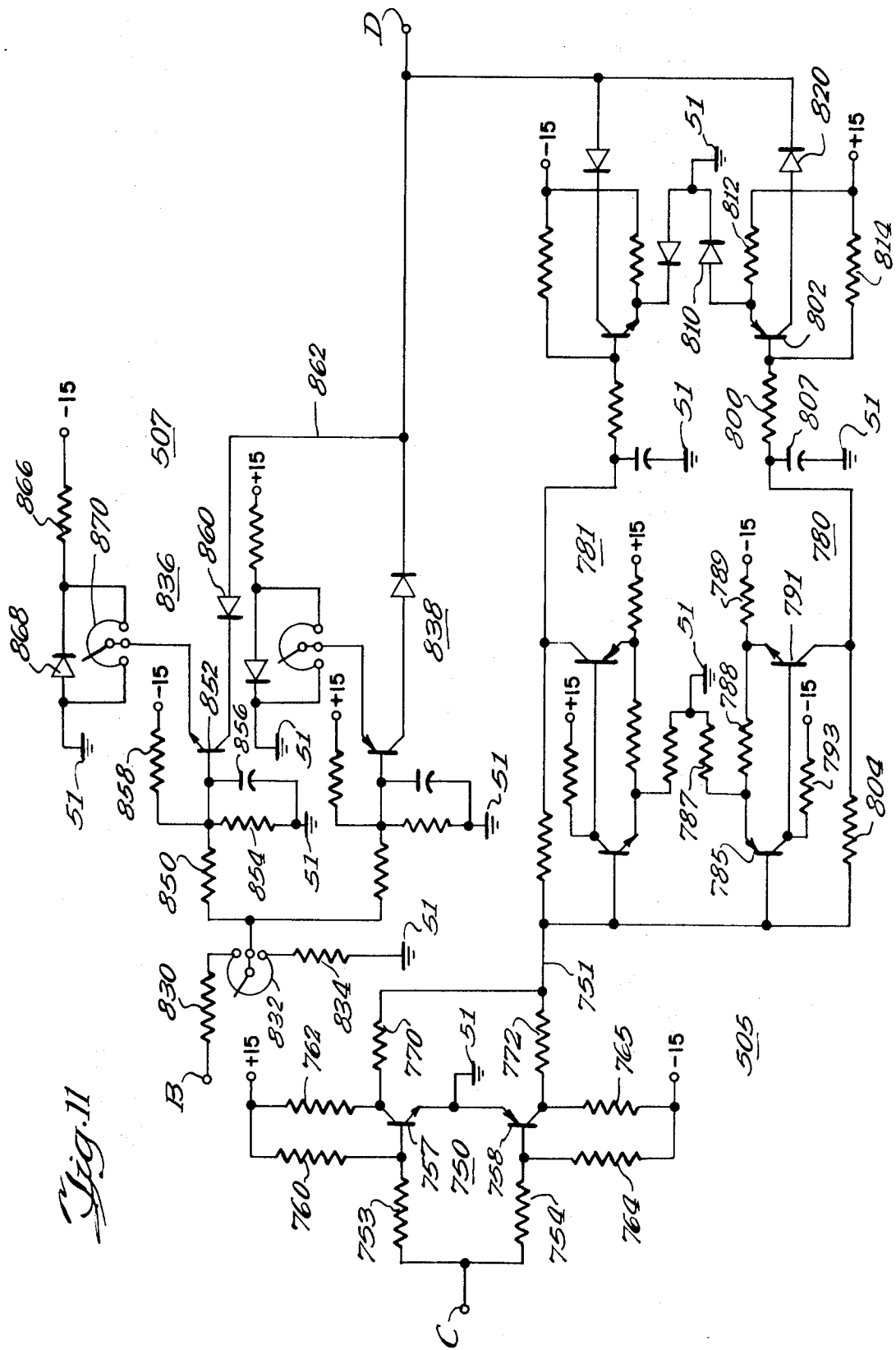

FIGS. 3a–d illustrate signal waveforms found in various parts of the control circuit, and in which:

FIG. 3a shows the power waveform from the three-phase power source of FIG. 1;

FIG. 3b shows the square wave output from diodes in the driving means illustrated in FIG. 1;

FIG. 3c shows the ramp-shaped driving waveform coupled to the pulse forming means illustrated in FIG. 1;

FIG. 3d shows a square wave generated by the pulse forming means of FIG. 1;

FIG. 4 is a circuit diagram of another embodiment of the invention, partly in block form and partly in schematic form, and utilizing many of the same circuits of FIG. 1;

FIG. 5 is a schematic diagram of one portion of the field control circuit, and the field cutoff circuit illustrated in block form in FIG. 4;

FIG. 6 is a schematic diagram of the remaining portion of the field control circuit of FIG. 5;

FIG. 7 is a curve of the control signal versus the voltage in a portion of the field control of FIG. 5;

FIGS. 8A and 8B illustrate signal waveforms across the motor armature and the motor field, respectively, absent a portion of the field control of FIG. 6 which modifies the waveforms;

FIG. 9 shows a gated power waveform from the three-phase power source, and a superimposed "rollover" preventing signal from the circuit in FIG. 4;

FIG. 10 shows another gated power waveform from the three-phase power source, and a superimposed "rollover" preventing signal from the circuit in FIG. 4; and FIG. 11 is a schematic diagram of the deceleration clamp and the zero clamp circuits illustrated in block form in FIG. 4.

While illustrative embodiments of the invention are shown in the drawings and will be described in detail herein, it should be understood that the invention is capable of embodiment in many different forms, and the present disclosure is to be considered as an exemplification of the principles of the invention and is not intended to limit the invention to the embodiments illustrated. Throughout the specification, values and type designations will be given for the components in order to disclose complete, operative embodiments of the invention. However, it should be understood that such values and types are merely representative and are not critical unless specifically so stated. The scope of the invention will be pointed out in the appended claims.

GENERAL OPERATION OF FIG. 1

In FIG. 1, a circuit for controlling the speed of rotation of a DC motor 13 is illustrated. Motor 13, having an armature 12 and a field coil 57, is controlled in accordance with information contained in an input control signal from a control signal source 28. The polarity of the control signal indicates the direction motor 13 is to rotate, and the magnitude of the control signal is proportional to the desired speed of rotation of the motor. The base speed of motor 13 is defined as the speed of rotation when the maximum allowable voltage is impressed across armature 12 and the maximum allowable current flows through field coil 57. Assuming, for example, a motor base speed of 850 r.p.m., a 10 to 1 variation in speed, from approximately 85 r.p.m. to 850 r.p.m., is obtained by varying the armature voltage over approximately the same range of magnitudes, as from 24 to 240 volts, while maintaining the field current constant. Once base speed is attained, the motor speed can be increased to about four times base speed by reducing the current through field coil 57, while maintaining the armature voltage constant. The control circuit is responsive to the input control signal to vary automatically the energization of both the armature and the field in the proportions necessary to drive the motor from one-tenth to four times base speed in direct linear relation to the magnitude of the input control signal.

For convenience, all parts previously disclosed and explained in our before-identified applications are identified in this application by the same reference numeral. Some of the components and voltages have somewhat different values but the operation of the circuits is the same. For a more complete description of the structure or operation of any of these parts, which carry numerals from 10 through 161 for elements first disclosed in application Ser. No. 478,701, and carry numerals from 200 through 430 for elements first disclosed in application Ser. No. 586,426, reference should be made to our before-identified applications. The reference numerals for elements disclosed in this application and not in the others begin with 500.

When operating the motor from zero through base speed, the field is saturated at all times and the armature terminal voltage is varied. This produces a constant torque drive which is well suited for machine tool applications. Actually, this range represents constant torque per ampere. As the motor draws less than rated current, the torque-speed curve is displaced downward, but still has the same shape. Similarly, at less than rated current, the horsepower is less, and the line between zero and base speed on the horsepower-speed curve has a lesser slope. Once the motor reaches its base speed, the voltage impressed across the armature is maintained at the maximum allowable value, and the field of the motor is weakened by reducing the amount of current gated to field coil 57. Although the speed of the motor increases, the torque decreases proportionally as the field is weakened. Since horsepower is a function of speed times torque, the motor operates in its constant horsepower range at this time.

The operation of the armature control portion of the circuit will be described insofar as it is essential for an understanding of the present invention. A source of three-phase AC power 10, having terminals 11', 11", 11''', is operatively coupled to armature 12 by gating means 15, which comprise pulse-actuated unidirectional conduction means, as silicon-controlled rectifiers (SCR's). As seen in FIG. 3a, three-phase energy with a 220-volt power waveform 17', 17", and 17''', each displaced 120° from the adjacent power waveforms, are available at the respective terminals 11', 11", 11'''. Throughout the specification, reference numerals with the same number of primes all refer to the same phase of power from the three-phase AC source 10.

Gating means 15 includes SCR's 20, each respectively coupled to one phase of the three-phase source, and poled to pass current in a direction which has been arbitrarily designated as forward, i.e., motor armature 12 turns in a forward direction when SCR's 20 conduct. SCR's 21 are poled in a reverse direction and are each respectively coupled to one phase of source 10. The point on power waveform 17 at which the SCR associated therewith begins conduction controls the amount of armature voltage.

A forward pulse forming means 23 and a reverse pulse forming means 24 for each phase of three-phase power are coupled between control signal source 28 and the SCR's. Each of the forward pulse forming means 23 has output lines 26 which are directly coupled to the corresponding gate input of the forward poled SCR's 20. Similarly, each of the reverse pulse forming means 24 has output lines 27 directly coupled to the gate input of the reverse poled SCR's 21. Only the forward or the reverse pulse forming means is energized at any instant of time, for generating pulses on either output lines 26 or 27 in order to fire the SCR's coupled thereto.

The pulse-forming means 23 and 24 are controlled in accordance with the presence or absence of a control signal from a control signal source 28. The control signal may originate from an external tape machine having an output command signal indicating the desired motor speed. A tachometer may be connected in a closed loop with the output signal circuit, as disclosed in our before-identified application Ser. No. 478,701, having an output signal indicating the instantaneous motor speed. These signals may be combined to form the control signal, which indicates what the motor should do to attain the desired speed. This control signal is coupled to a differential operational amplifier 74 in source 28, and through a 5.6-kilohm voltage dropping resistor 85 to a line 29 connected to the armature control circuit. The control signal has a polarity that indicates the direction motor 13 is to turn, and a magnitude that indicates the desired motor speed.

For example, at a junction point A between amplifier 74 and resistor 85, the control signal may have a magnitude from 0 through ±6 volts, with ±1.5 volts representing the base speed of motor 13. The control circuit increases the terminal voltage across armature 12 as the control signal at junction A varies from 0 through ±1.5 volts, and thereafter weakens the current through field coil 57 as the control signal varies from ±1.5 volts through its maximum value.

Preferably, the control circuit linearly varies speed from 0 through maximum r.p.m. (at about four times base speed) with respect to the control signal at junction A.

In order to control the terminal voltage across armature 12 as the control signal at junction A varies between 0 and ±1.5 volts, the time of firing of SCR's 20 and 21 is varied in proportion to the absolute magnitude of the control signal. For this purpose, the control signal on line 29 is coupled to an emitter follower 31 which is a portion of a forward bias means 32 and a reverse bias means 33. The forward 32 and reverse 33 bias means have output lines 36 and 39, respectively, which carry a bias output signal adjustable throughout a range of magnitudes. Each of the bias output lines has in the absence of a control signal on line 29 a fixed voltage. Emitter follower 31 causes the current through the bias means to vary in accordance with the polarity and magnitude of the signal on line 29. This varying current causes the bias output signals on output lines 36 and 39 to vary about the fixed value in the same direction as the signal on line 29.

In order to determine the instantaneous phase of the power waveform coupled to each pair of SCR's, a driving means 43 for each phase of source 10 is coupled to terminals 11. Each of the driving means 43 includes a clamp and an integrator which change the power waveforms 17 into a driving waveform 44 which is available at output lines 45. The driving waveform 44' for driving means 43', shown in FIG. 3c, has an actuating or peak point 47' that occurs at the end of every half-cycle of the respective power waveform 17', FIG. 3a. Similar driving waveforms 44 (not illustrated) for each of the other two phases are developed by driving means 43'' and 43''', and have the same phase relationship with respect to the power waveform coupled thereto as is shown in FIGS. 3a and 3c for the waveform 17' and 44'.

Each of the pulse-forming means 23 and 24 is responsive to the relative magnitudes of the driving waveform 44 and the bias output on either lines 36 or 39 to form a pulse that precedes the occurrence of the peak point 47 of the driving waveform 44 coupled thereto by a time interval proportional to the magnitude of the bias, which in turn is proportional to the magnitude of the control signal on line 29.

This pulse, which is carried on lines 26 or 27, actuates the SCR coupled thereto, passing similar portions of only one-half cycle of the power waveforms 17 to the armature 12 of the motor. The forward and reverse bias means may, if desired, be designed to gate crossfire spikes to armature 12 in the absence of a control signal, as disclosed in detail in our application Ser. No. 478,701.

As the control signal at junction A rises above the transfer point, i.e., the division between the constant torque and constant horsepower ranges (which also corresponds to base speed), the control circuit decreases the current flowing through field coil 57. For this purpose, the control signal at junction A is coupled through an amplifier 200 to a field control circuit 201. Field control 201 causes a saturation current to flow through field coil 57. However, as the control signal at junction A exceeds 1.5 volts, either in the positive or negative direction, field control 201 becomes operative to decrease the current through field winding 57, increasing motor speed.

During the time field control 201 is operative, the armature control circuit maintains the voltage across armature 12 at a fixed value corresponding to the rated voltage for the armature. This is accomplished by clamping the control signal on line 29 at a maximum value, which causes the rated voltage to be impressed across armature 12. For this purpose, a pair of series-connected diodes 88 and a pair of oppositely poled series-connected diodes 89 are connected after the 5.6-kilohm resistor 85, between line 29 and a reference or ground 51. Diodes 88 and 89 are silicon type 1N1696, each having 0.6 voltage drop thereacross when conducting. Thus, although the absolute voltage at junction A rises above the 1.5-volt transfer level, the voltage on line 29 cannot exceed a maximum value of ±1.2 volts.

As armature 12 rotates, a back e.m.f. is generated of a value less than the magnitude of the voltage gated to the armature by the SCR's. The difference between the gated voltage and the back e.m.f. causes a current to flow through armature 12, producing a torque sufficient to overcome the losses produced by the motor load and friction. As the external motor load is increased, armature 12 is subject to a greater drag, and hence the speed of rotation drops proportionally. As the speed decreases, the back e.m.f. generated across the armature also decreases, creating a larger voltage difference which causes more current to flow through the armature. Armature 12 may drive a tachometer connected in a closed loop with control signal source 28, as disclosed in our application Ser. No. 478,701. In such a circuit, the decreased speed of the armature, caused by an increased external load, results in a larger control signal which returns the motor to its original speed.

The back e.m.f. across armature 12 sometimes exceeds the magnitude of the voltage gated to the armature, and this excessive e.m.f. may reach undesirable proportions which could damage the motor and/or the control circuit. To obviate this problem, a field cutoff circuit 203 is provided which smoothly dissipates excessive e.m.f. The input of field cutoff 203 is coupled to a junction point B which is directly connected to one side of armature 12. Since the other side of armature 12 is directly connected to ground 51, the voltage at junction B is the back e.m.f. generated by the motor. When the back e.m.f. reaches a predetermined excessive level, field cutoff 203 produces an output signal which disables field control 201, stopping the current flow through the field winding 57 and smoothly dissipating the voltage created across winding 57 by collapsing magnetic flux.

It should be noted that when the excessive back e.m.f. exceeds the maximum value of voltage available from power source 10, the SCR's which would normally conduct current through armature 12 are, during this time, back biased and hence inoperative. Since no current flows through armature 12, the motor is in fact coasting, and it is possible to cutoff the current to field winding 57, without causing the speed increase normally expected.

Field control 201 and field cutoff 203, in conjunction with the armature control circuit, provide an effective motor control system for operating a DC motor at maximum efficiency. However, in certain critical applications, as in machine tools, special problems occur which, if not overcome, would limit the use of the control system to less exacting uses.

One such problem occurs when the rotating motor is to decelerate quickly to a slower speed, or to reverse its direction of rotation. If the motor decelerates slowly no problem occurs, for the control signal at junction A merely slowly decreases in absolute magnitude, and the control circuit is responsive thereto to decrease slowly the speed of rotation of the motor. However, when the motor is to decelerate quickly, the control signal at junction A may reverse polarity. This can occur even though the motor is to decelerate to a slower speed, rather than reversing its direction of rotation, if the motor is connected in a closed loop system, as by a tachometer connected to armature 12.

When the control signal reverses polarity the oppositely poled SCR's are fired, gating a braking current to armature 12. Unfortunately, the back e.m.f. still exists at this time, having a polarity which aids a forward current flow from the SCR's gated to brake the motor. As a result, large surges of braking current pass to armature 12, causing the motor to experience violent, uneven, decreases in speed. Although some DC motors can withstand this condition, the external load which is driven by the motor usually cannot.

To overcome this problem, a phase back circuit 204 is provided which smoothly decelerates motor 13 to the new desired speed, regardless of the rate at which the control signal changes in value. One input of phase back circuit 204 is connected to the output junction C of amplifier 200. The other input of phase back circuit 204 is connected to a point which carries a signal indicative of the instant direction of rotation of motor 13, as junction B in the armature circuit. Circuit 204 is responsive to the manner in which these signals change in value, to generate a phase back signal only when the motor is to decelerate. This phase back signal energizes a relay which closes its contacts R, causing the SCR's to fire at a later point on the waveform than they otherwise would, reducing the current surges passed to armature 12, as discussed in detail in our application Ser. No. 586,426. After the motor has sufficiently decelerated, phase back circuit 204 deenergizes the relay and opens contacts R, thereby automatically disconnecting itself from further control over the firing time of the SCR's.

When the motor is rotating at a high speed, and hence generating a large magnitude of back e.m.f., the initial braking current surges may be of an undesirable magnitude, despite the operation of phase back circuit 204. In such a situation, if the input control signal should reverse polarity before phase back circuit 204 can react to retard the firing angle of the SCR's, a violent braking action would occur, as previously described. Conversely, even though phase back circuit 204 is energized, it may be desirable to prevent the braking SCR's from being energized until the back e.m.f. is reduced to an acceptable level. For this purpose, a clamp circuit 205 is provided which prevents the oppositely poled braking SCR's from being energized until the back e.m.f. drops below a predetermined value. The input circuit for clamp 205 is coupled to the back e.m.f. at junction B. When the motor rotates at a speed above approximately two-thirds base speed, clamp 205 is energized to maintain the voltage on line 29 at a minimum predetermined magnitude. According to the specific embodiment disclosed in the drawings, line 29 is clamped to an absolute value of at least 0.2 volts, representing the minimum command necessary to keep motor 13 turning in the same direction. For example, if the control signal on line 29 is positive, indicating a forward direction of rotation, clamp 205 when energized maintains a signal on line 29 of at least +0.2 volts positive. Clamp 205 prevents the input control signal from reversing polarity when the back e.m.f. is above a predetermined value, hence preventing the oppositely poled SCR's from firing until the value of back e.m.f. drops to a safe level.

This application is partly a division of our application Ser. No. 586,426, and herein discloses and claims a portion of the circuit of the field control 201, as originally disclosed in application Ser. No. 586,426. The general operation and the detailed description of other circuits, some of which have not previously been disclosed, are presented after the detailed description of the field control of FIG. 2. For a detailed description of individual circuits shown in block form and not described herein, reference should be made to our earlier before identified applications.

FIELD CONTROL OF FIG. 2

Figure 2:
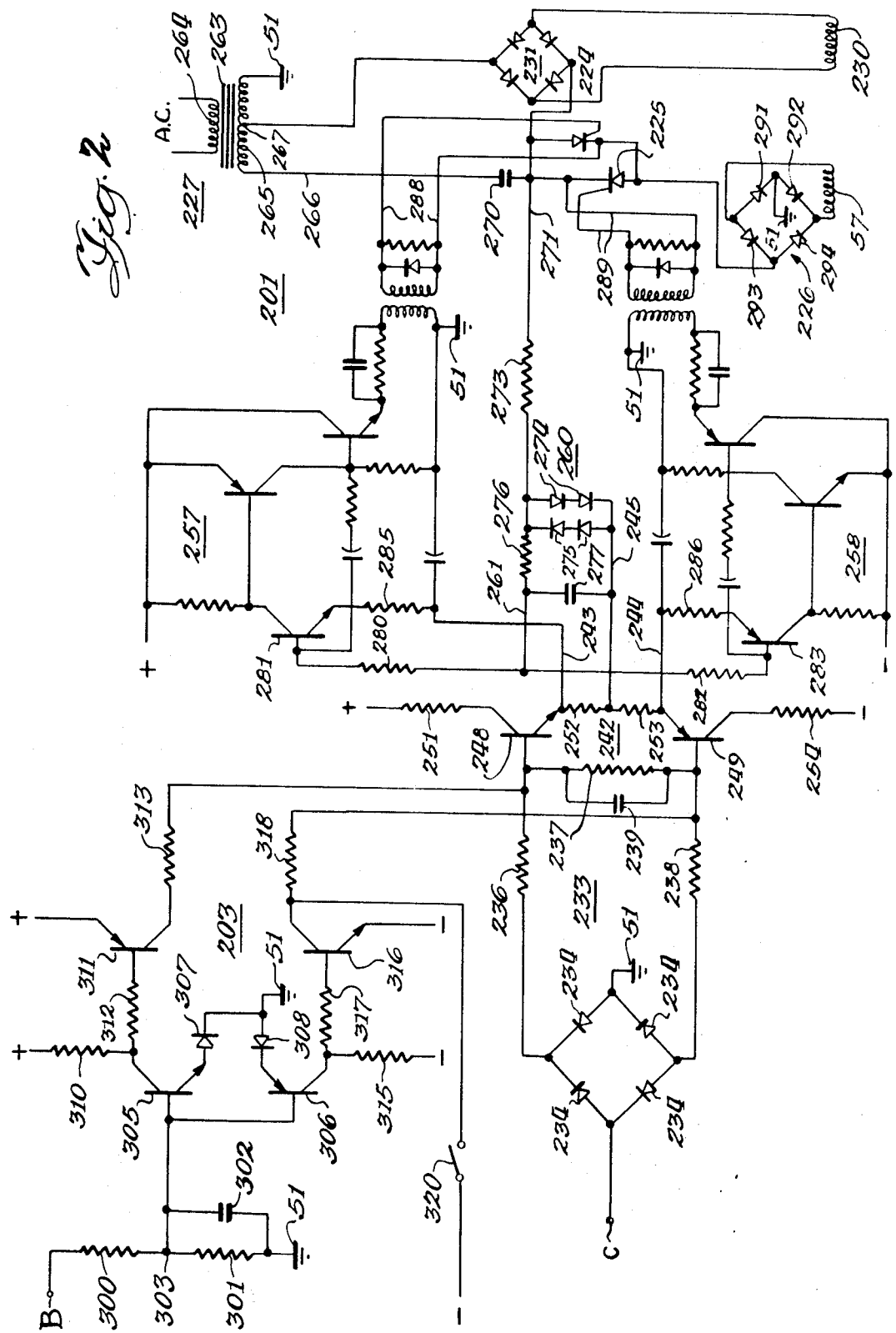
FIG. 2 is a schematic diagram of the field control and field cutoff circuits illustrated in block form in FIG. 1.

The output signal at junction C of amplifier 200 is coupled to field control circuit 201, illustrated in detail in FIG. 2. A pair of back-to-back connected SCR's 224 and 225, connected in series with a full-wave rectifier 226, are coupled between a source 227 of alternating current and field winding 57, for controlling the strength of the magnetic field. Field control 201 is designed to cause SCR's 224 and 225 to pass substantially all of both portions of the AC waveform from source 227 when the signal at junction C is less than 1.2 volts, causing a maximum amount of full wave direct current to pass the field winding 57, saturating the magnetic flux field of the motor.

As the input signal exceeds, either positively or negatively, the threshold value (1.2 volts at junction C), field control 201 is responsive thereto for cutting back the firing angle of SCR's 224 and 225, thus reducing the current passed to field coil 57. As previously explained, the weakened field causes the motor to increase in speed.

An auxiliary field winding, continually energized by a fixed value of DC current, is normally provided for DC motors in order to prevent a dangerous runaway condition, should the motor field fail at any time. Without the addition of such an auxiliary field winding, the motor speed would theoretically increase to infinity if the current through field coil 57 suddenly ceased to flow, caused for example by a failure of the field winding itself, or a failure of certain of the components in field control 201. Such a runaway condition, in practice, could cause the destruction of the motor. Therefore, to maintain a minimum magnetic flux field for safety purposes, an auxiliary winding 230 is coupled through a full-wave rectifier 231 to AC source 227. Of course, auxiliary winding 230 and its associated energizing circuit may be eliminated if a different means for preventing a runaway condition is provided.

Field control 201 has an output network 233 for activating the field control circuit when the control signal at junction C rises absolutely above 1.2 volts. For this purpose, four diodes 234 are connected in a full-wave rectifier bridge between junction C and ground 51. Each diode 234 has a 0.6 voltage drop thereacross when conducting. These diodes, as well as all other diodes in the system requiring a 0.6 voltage drop in the forward direction, may be silicon type 1N1696. A series circuit is connected across the output of the diode bridge, including a 2.7-kilohm resistor 236, a 56-kilohm resistor 237, and a 2.7-kilohm resistor 238. Resistor 237 is bypassed by a 3.3-microfarad capacitor 239.

Coupled to input network 233 is a difference emitter follower 242 having a pair of output lines 243 and 244. As will appear, output lines 243 and 244. As will appear, output lines 243 and 244 at all times have equal output voltages that are of opposite polarity with respect to the polarity of a reference line 245. As the input signal at junction C increases above 1.2 volts, the voltages on lines 243 and 244 increase proportionally in an absolute manner from the voltage on line 245.

Difference emitter follower 242 is formed from a NPN transistor 248, as a 2N1304, and a PNP transistor 249, as a 2N305, connected in a unique circuit which may generally be described as the emitter follower type. The base of each transistor 248 and 249 is coupled to a different side of resistor 237. The collector and emitter electrodes of the two transistors are connected in a series circuit between the +15 and −15 volt DC source. This series circuit consists of a 680- ohm resistor 251 connected between +15 volts and the collector of transistor 248, a pair of 100-ohm resistors 252 and 253 connected between the emitters of transistors 248 and 249, and a second 680-ohm resistor 254 connected between the collector of transistor 249 and −15 volts. The reference line 245 is connected to the junction point between resistors 252 and 253. The output lines 243 and 244 of the difference emitter follower are coupled to resistors 252 and 253.

The signal at junction C, whether positive or negative with respect to ground 51, passes through the two correspondingly poled diodes 234 to the series circuit of input network 233. For signals below the threshold value, the largest voltage drop occurs across the conducting diodes. However, since diodes 234 have a maximum 0.6 voltage drop thereacross, an input signal which exceeds absolutely 1.2 volts causes the voltage coupled to one base of the transistors 248 and 249 to rise in direct proportion to the magnitude of the signal. By way of example, it will be assumed that a −4.0-volt signal exists at junction C. This arbitrarily selected signal, in the constant horsepower range, will be used in conjunction with this and the remaining drawings to illustrate the operation of the circuit for a specific signal.

As junction C goes to −4.0 volts, a total of −1.2 volts is dropped across the two conducting diodes 234, with the remaining −2.8 volts being dropped across the remaining portion of input network 233. Since resistor 237 is of much greater resistance than resistors 236 and 238, substantially all of the voltage drop occurs across this resistor. Therefore, the base of transistor 248 is substantially at the voltage dropped across diode 234, namely −0.6 volts. Another −2.8 volts is dropped across resistor 237, causing the base of transistor 249 to be approximately at −3.4 volts. The remaining −0.6-volt drop occurs substantially across the other of the conducting diodes 234.

The −3.4-volt signal at the base of transistor 249 heavily forward biases this transistor, causing a large current flow through the series circuit connected to the collector-emitter electrodes. Since the emitter-base junction of transistor 248 has not been affected by the negative input signal, transistor 248 has a relatively high resistance with respect to the resistance of transistor 249. The resulting current flow between the + and − DC sources produces a 2.4-volt drop across resistors 252 and 253.

It should be noted that because transistors 248 and 249 present different impedances to the series circuit, the junction point corresponding to line 245 no longer remains at substantially zero volts potential, but changes in proportion to the signal at junction C. However, since resistors 252 and 253 are of equal value, the voltages on lines 243 and 244 always are of equal absolute magnitude with respect to the instantaneous voltage on reference line 245, and are of opposite polarity. Thus, difference emitter follower 242 generates a pair of output signals of equal amplitude and opposite polarity, whose amplitude depends on the amplitude of signal at junction C. As the signal at C varies between 0 and ±1.2 volts, the voltage on lines 243 and 244 remains substantially zero. When the signal at junction C increases either positively or negatively beyond 1.2 volts, the absolute values of the voltages on lines 243 and 244 increase from the voltage on reference line 245, in direct proportion to the amplitude of signal at junction C.

The output signals on lines 243 and 244 bias pulse-forming means 257 and 258, controlling the time of generation of the pulses which fire SCR's 224 and 225 respectively. When the output signals on lines 243 and 244 are substantially near zero potential, pulse-forming means 257 and 258 generate a pulse substantially at the beginning of each half-cycle of AC from source 227, causing SCR's 224 and 225 to pass substantially all of the AC waveform. However, as the absolute magnitude of the signals on lines 243 and 244 increases, the time of firing of the SCR's is retarded, reducing the amount of current coupled to field coil 57.

The instantaneous phase of the AC waveform from source 227 must be monitored in order to determine the correct time for firing pulse forming means 257 and 258. For this purpose, a driving means 260, having a driving waveform output on a line 261, is coupled to AC source 227. Line 261 is coupled to both of the pulse-forming means 257 and 258. By comparing the relative magnitude of the driving signal on line 261, with the bias signal on lines 243 and 244, the time of firing for SCR's 224 and 225 is established.

Source 227 is formed by a transformer 263 having a primary winding 264 and a secondary winding 265. Since the AC waveform from source 227 does not have to be related in phase to the AC waveforms 17 gated to the armature of the motor, primary 264 may be coupled across any phase of source 10, illustrated in FIG. 1, or may be coupled to an independent AC power source. One side of secondary winding 265 is coupled to ground 51. The other side 266 of the secondary winding has an AC waveform thereon of 160 volts r.m.s. potential with respect to ground 51. Secondary winding 265 also has a tap 267 thereon, coupled to full wave rectifier 231 for producing a fixed DC current for auxiliary field 230. Tap 267 has a 55-volt r.m.s. potential with reference to side 266.

The single-phase AC signal on line 266 is coupled through a DC blocking capacitor 270 to a line 271 common to SCR's 224 and 225, the input of driving means 260, and full-wave rectifier 231.

Driving means 260, in conjunction with pulse-forming means 257 and 258, operates in an identical manner with driving means 43 and pulse-forming means 23 and 24 for one phase of AC waveform in the armature control circuit. The operation of these circuits will be described in sufficient detail for the purposes of understanding the present invention, however, for a more complete description of these circuits, reference may be made to the before-identified application Ser. No. 478,701.

The AC waveform on line 271 is similar to waveform 17' illustrated in FIG. 3a. This waveform is coupled through a 20-kilohm resistor 273 to clipping diodes 274 and 275, poled in opposite directions. The 0.6 forward voltage drop across each conducting diode produces a low amplitude generally square wave signal similar to square wave 98', illustrated in FIG. 3b. It should be noted that the waveform in FIGS. 3b, 3c, and 3d are illustrated greatly enlarged with respect to the waveform in FIG. 3a.

Square wave 98' is integrated by a 1,000-ohm resistor 276 and a 3.3-microfarad capacitor 277 for producing on line 261 a ramp-shaped driving waveform, similar to waveform 44' in FIG. 3c. This driving waveform has an actuating or peak portion similar to portion 47'. However, it should be noted that the driving waveform on line 261 varies with reference to the potential of line 245, and not with reference to ground 51 as was true of the driving waveform from driving means 43 in FIG. 1.

The driving waveform on line 261 has a peak ±1.1-volt potential. This waveform is coupled through a 2.7-kilohm resistor 280 to the base of a NPN transistor 281 in pulse former 257, and through a 2.7-kilohm resistor 282 to the base of a PNP transistor 283 in pulse former 258. The emitter of transistor 281 is coupled through a 100-ohm resistor 285 to output line 243 from difference emitter follower 242. Similarly, the emitter electrode of transistor 283 is coupled through a 100-ohm resistor 282 to output line 244 of the difference emitter follower.

Transistors 281 and 283 generate a pulse when the potential difference between the waveforms on line 261, compared with the waveforms on either lines 243 or 244, forward biases the emitter-base junction of the transistor. When the control circuit is operating in the constant torque range, substantially zero potential exists on lines 243 and 244. Therefore, the driving waveform, seen in FIG. 3c, drives transistor 281 into conduction during the first or positive half-cycle when the driving waveform crosses the zero axis and goes positive, at point 153. Similarly, the negative going driving waveform drives transistor 283 into conduction during the second or negative going half-cycle, when the waveform again crosses the zero axis and goes negative. As explained in detail in our application Ser. No. 478,701, these crossover points occur approximately 30° after the beginning of each half-cycle of AC waveform 17. Therefore, transistors 281 and 282 are conductive for approximately 150° of each half-cycle of AC waveform on line 271. This is sufficient to pass substantially full-wave rectified current to field winding 57.

The remaining components in pulse-forming means 257 and 258 merely help to form and shape the pulse output when transistors 281 and 283 are forward biased, as explained in our before identified application Ser. No. 478,701, for pulse-forming means 23 and 24. For the purpose of this disclosure, it is sufficient to note that pulse-forming means 257 produces an output pulse 139 on lines 288, and pulse-forming means 258 produces an output pulse on lines 289, which triggers the SCR associated therewith essentially at the same time that the respective transistors 281 or 283 become conductive.

As the input control signal at junction C rises above the transfer point, the absolute value of the voltages on lines 243 and 244, which tend to back bias the transistors 281 and 283, increase with reference to the voltage on line 245. This in turn causes the transistors to be forward biased at a later time in the half-cycle, when the potential of the driving waveform exceeds the level of the bias output signal from difference emitter follower 242. Since line 243 always goes positive with respect to line 245, and line 244 always goes negative with respect to line 245, transistors 281 and 283 can only be energized during the positive and negative half-cycles, respectively, of the AC waveform on line 271.

For example, when a −4-volt signal exists at junction C, line 243 goes approximately 1.2 volts positive, and line 244 goes approximately 1.2 volts negative, with respect to line 245. Since the ramp-shaped driving waveform on line 261 never exceeds approximately ±1.1 volts magnitude with respect to line 245, both transistors are back biased. This prevents a pulse from being generated, thereby preventing SCR's 224 and 225 from gating any portion of the AC waveform to full-wave rectifier 226. As a result, the field current through coil 57 ceases to flow, causing the motor to run at its maximum speed. Of course, the values of the resistors and other components can be changed so as to vary the magnitude of the control signal at junction C which blocks the current flow to field coil 57.

Because the oppositely going portions of the driving waveform on line 261 are symmetrical, and because the bias signals on lines 243 and 244 are of equal and opposite potential at all times, SCR's 224 and 225 pass identical portions of the AC waveform, e.g., the last 120° of each half-cycle, causing a DC current output from rectifier 226 with minimum ripple. The difference emitter follower, in conjunction with the pulse-forming means and the SCR gating circuit, are useful in many applications where current is to be gated to a load, and are not limited to use in a motor control circuit.

Full-wave rectifier 226 is formed from diodes 291, 292, 293 and 294, poled to provide a unidirectional conduction path to field coil 57 for rectifying the alternately gated similar portions of AC waveform. The relatively large inductance of the field coil aids in smoothing out the fluctuations in the DC level.

When current flow to an inductor is decreased, the collapsing magnetic field around the inductor attempts to maintain the current flow in the original direction, as is well known. As a result, the voltage across the field coil tends to change polarity rapidly, which is undesirable in motor speed control applications. However, according to the invention, series diodes 293 and 294 form a shunt path across field coil 57. Similarly, diodes 291 and 292 form a series shunt path to ground 51 across field coil 57. The diodes 291–294 are poled to short out the voltage generated by the collapsing magnetic flux around the field coil, thereby allowing current to circulate nearly undiminished, allowing the motor field to make gradual changes to new speed commands.

GENERAL OPERATION OF FIG. 4

In FIG. 4, a motor control system which operates similar to the system of FIG. 1 is illustrated. A field control 500 controls the current through the field winding 57, in order to cause the motor control to operate in the constant torque range for control signals below the transfer point, and in the constant horsepower range for control signals above the transfer point, similar to field control 201 of FIG. 1. Like the prior field control 201, the circuit of control 500 is responsive to bipolar signals from source 28 to control energization of an SCR for gating current to the coil 57.

Field control 500, however, uses a different circuit than the prior field control 201, and has certain advantages. In the present circuit, three-phase current is gated by control 500 to coil 57, in order to more smoothly control field current. A safety circuit in control 500 eliminates the effect of armature-field magnetic interaction. For example, it is possible for the SCR's 20 or 21 in the armature control to be fired at approximately the same time that the SCR's in field control 500 are fired. The current pulse through armature 12, caused by SCR's 20 or 21, generates a magnetic field which cuts coil 57, inducing a voltage therein. Without the safety circuit, this voltage may subtract from the voltage produced by the field control, resulting in a net voltage across field coil 57, which is not equal to the desired voltage as commanded by the input signal to the control 500. The safety circuit eliminates this problem. Another difference is that the input to field control 500 is from the control signal source 28, rather than from junction C, as was used for field control 201. The input signal may be from a tachometer in source 28. By including a function generator for matching the tachometer signal to the field characteristics of the motor, a very precise control is formed.

Field cutoff circuit 503, FIG. 4, operates in the same manner as the field cutoff circuit 203 in FIG. 1. However, the circuit is different in order to interconnect properly with the different field control 500.

To control the deceleration characteristics of the motor, a zero clamp circuit 505 and a deceleration clamp circuit 507 are utilized in place of both the phase back circuit 204 and the clamp circuit 205 of FIG. 1. Assuming a control signal at junction A is causing motor 13 to rotate clockwise, both clamp circuits 505 and 507 are set in clockwise modes of operation appropriate for the polarity of the control signal at junction D. When the motor is to come to a stop, the termination of the input command signal to source 28 will cause the error signal output from operational amplifier 74 to begin to change in the opposite polarity direction.

The clamp circuits allow the error signal to drop until predetermined absolute amplitude levels are reached, at which points the error signal is clamped at minimum absolute amplitude levels. The clamped levels are maintained until a predetermined time duration lapses, or until an input signal to one of the clamp circuits drops below an excessive amplitude level. During operation of the clamps, the firing point of the SCR's 20 or 21 will have been effectively cut back from the firing point which the unclamped error signal would have produced, causing the motor armature 12 to decelerate in a smoother manner. The clamps 505 and 507 cooperate and act in two separate steps to control the deceleration characteristics of the motor. The circuit of both clamps 505 and 507 will be explained in detail hereafter.

The operation of the armature control for SCR's 20 and 21 has been explained in our before-identified applications. In certain instances, as will be explained, it is possible that one of the SCR's may still be in a forward biased state when the signal to its control terminals 26 or 27 has terminated and an SCR poled in the opposite direction is to be fired. This condition can create a fault, called "rollover" in which the still forward-biased SCR shorts the current gated through another SCR. The circuit of FIG. 4 prevents this condition from occurring.

Each winding of transformer 10 has a rollover preventing stage 510 associated therewith. The stages 510 cause a voltage spike to be generated at the 90°, or maximum peak point of AC voltage from the associated transformer winding. This peak is of sufficient magnitude to insure that the previously gated SCR 20 or 21 will be reverse biased and thus turned off at the proper time. Stages 510 are controlled by pulsers 512 and sources 514 of fixed bias, which sets the time of generation of the voltage spikes at the 90° point of three-phase AC.

The operation of the remaining portions of FIG. 4 is similar to that described for FIG. 1, and will not again be described in detail. It should be noted that the block labeled Bias corresponds to blocks 31, 32 and 33 in FIG. 1, and generates the same signals coupled to the forward pulse forming means 23 and the reverse pulse forming means 24, as shown in detail in FIG. 1.

FIELD CONTROL OF FIGS. 5 AND 6

The input signal of field control 500, FIG. 5, is the output signal from a tachometer 520 connected to motor armature 12 and located in control signal source 28. The output signal is bipolar, that is, may have either a positive or a negative polarity, depending upon the direction of rotation of the armature, and an absolute amplitude directly proportional to the speed of rotation of the armature. The portion of circuit 500 illustrated in FIG. 5 converts this signal into a unidirectional signal, on a line 560, having an amplitude corresponding to the absolute amplitude of the signal from tachometer 520, and shaped to match the transfer characteristics of the field coil. This signal is coupled to the remaining portion of field control 500, illustrated in FIG. 6, in order to gate SCR's for passing current to coil 57. The circuit for energizing auxiliary field coil 230 is not illustrated, and may take any suitable form, such as the form illustrated in FIG. 2.

Considering the circuit of FIG. 5 in detail, the signal from tachometer 520 is coupled through either a diode 523 or a diode 524, depending upon the signal polarity, to corresponding inputs of an operational amplifier 526. Positive going signals through diode 523 are coupled through a positive gain potentiometer 528, 100 kilohms to the (+) input of amplifier 526. The (+) input is connected through a 100-kilohm resistor 530 to ground 51. Negative signals are coupled through diode 524 and a 100-kilohm resistor 532 to the (−) input of amplifier 526. The output of the amplifier is coupled through a 2.7-kilohm resistor 534 and a Zener diode 535 to a line 537 which connects to a function generator or signal-shaping network 540. The output of amplifier 526 is also connected to feedback elements, in the form of a negative gain potentiometer 542 and a 100-kilohm resistor 543, connected between the output and the (−) input. Potentiometer 542 and resistor 543 are bypassed by a 0.001-microfarad capacitor 545. The capacitor is also coupled through a Zener diode 547 to a line 549 also connected with signal-shaping network 540.

Operational amplifier 526 serves to convert the bipolar signal from tachometer 520 into a signal having only one polarity, with an amplitude corresponding to the absolute amplitude of the bipolar signal from tachometer 520. The amplifier 526 operates as an amplifier with a gain of one for a positive input, and as an inverter with a gain of one for a negative input. A zero signal input results in a zero signal output from the amplifier. Capacitor 545 controls any oscillations which might occur from shock excitation at the input, improving the stability of the circuit.

Zener diodes 535 and 547 block signal voltages up to approximately 2.6 volts, corresponding to the base speed of the motor. For signals below this value, the control 500 is effective to gate maximum current to the field coil, maintaining the field saturated. As signals rise above 2.6 volts, continually increasing voltages are coupled to lines 537 and 549 in order to reduce the current flowing to the field, and thus cause the motor to operate in the constant horsepower range.

Line 537, connected with signal-shaping network 540, is also directly connected to the base of an NPN transistor 552, connected as an emitter follower. The collector of transistor 552 is connected through a 680-ohm resistor 554 to +15 volts DC. The emitter is connected through a 800-ohm potentiometer 556 and a 100-ohm resistor 557 to line 560 connected to the remaining portion of the field control 500 in FIG. 6. As the signal from amplifier 526 gradually increases above 2.6 volts (disregarding the effect of network 540), the signal passed through Zener diode 535 forward biases transistor 552 and causes the voltage at line 560 to increase a corresponding amount.

Signal-shaping network 540 contains a plurality of stages, each having a different one of potentiometers 562, 563, 564, and 565 therein, to adjust the transfer characteristics of the network so that the output of tachometer 520 matches the motor field characteristics. Each of the four stages uses similar components, having different component values. The first stage includes an NPN transistor 570 having its collector directly connected to line 537, and its emitter connected through potentiometer 562, 800 ohms resistance, and a 1.0-kilohm resistor 572 to ground 51. The base of transistor 570 is connected to the junction between a resistor 573 and a resistor 574, as 47 kilohms, connected in series between line 549 and ground 51.

The operation of the first and remaining stages of signal-shaping network 540 will be explained with reference to FIG. 5 and the curve of FIG. 7, which shows the voltage output $V_o$ on line 537 (with respect to ground 51) versus the bipolar signal from tachometer 520. When the tachometer signal is less than the point at which Zener diodes 535 and 547 conduct, zero volts is maintained on line 537, and thus the motor control operates in the constant torque range. As the motor reaches base speed, corresponding to transfer points 577 in FIG. 7, the breakover potential of the Zeners is exceeded, and increasing voltage is passed to line 537.

The four stages in network 540 now control the shape of the curve of FIG. 7, until maximum motor speed is reached. Depending upon the particular motor which has been chosen, the maximum speed may be from two times (2×) to four times (4×) the base speed of the motor when at transfer points 577. For motors with these different characteristics, different amounts of voltage must be passed to the field coil.

As Zener diode 535 first breaks over, the curve of voltage $V_o$ is shaped by switching on the first stage containing potentiometer 562. The first stage is effective until a transfer point 580, FIG. 7, is reached, at which time the second stage containing potentiometer 563 is turned on, lowering the equivalent resistance of network 540 and thus lowering the slope or rate of rise of voltage. The first two stages are effective until a second transfer point 582, is reached, at which time the third stage is turned on until a transfer point 583 is reached, at which time the fourth stage is turned on and remains on through the point 584 of maximum motor speed.

The transfer points 577, 580, 582 and 583 along the input signal abscissa are selected by controlling the value of the voltage divider resistors connected to the bases of the switching transistors in network 540. For example, the values of resistors 573 and 574 control the transfer point 577, while the value of potentiometer 562 controls the slope of the curve. Corresponding parts in the remaining stages produce corresponding control over the remaining transfer points and slopes of the curve. The four stages cooperate to generate four straight line curves joined at their ends, which curves are shaped to approximate the motor field curve from base speed through maximum speed.

The operation of the first stage of network 540 is exemplary of the operation of each stage. The signal from operational amplifier 526 passes through Zener diode 547, when breakover is exceeded, and voltage divider resistors 573 and 574 to ground 51. When the potential at the junction point of resistors 573 and 574 forward biases transistor 570, current flows from operational amplifier 526, through Zener 535, transistor 570, potentiometer 562 and resistor 572 to ground 51. In effect, a preselected value of resistance has been switched between line 537 and ground 51. As the other stages are forward biased, more resistance is switched in parallel, thereby lowering the rate of rise of voltage $V_o$.

Transistor 552 is connected as an emitter follower which isolates the line 560 from the signal shaping network 540. The signal on line 560 essentially corresponds to the voltage $V_o$ in FIG. 7, except that it may be modified by the field cutoff circuit 503, as will be explained.

Turning to FIG. 6, line 560 is connected in series with a 100-ohm resistor 600, a 100-ohm potentiometer 602, and a 1.0-kilohm resistor 604 to +15 volts DC. The line 560 is also connected through a 1.0-kilohm resistor 607 to a field saving voltage source, such as +15 volts DC (should the signal from line 560 fail). The line 560 is also bypassed to ground 51 through a 1.0-microfarad capacitor 608. The wiper of potentiometer 602 is coupled to a line 612 which connects with the circuit controlling the firing angle of SCR's for supplying current to field coil 57. This circuit could take the form illustrated in FIG. 2, in which two-phase current is gated to coil 57. Preferably, however, the circuit takes the form illustrated in FIG. 6, in which three-phase current is gated to coil 57, thereby providing smoother control of the DC across the field coil.

For this purpose, an SCR 615 is associated with each phase of current from the three-phase source terminals 11 (connected to the transformer 50 in FIG. 4). Each SCR has its anode and cathode shunted by a series-connected 0.5-microfarad capacitor 617 and a 47-ohm resistor 618. All cathodes of SCR's 615 are coupled together, and through a diode 620 to one side of field coil 57. The other side of the field coil is coupled through a 1.0-ohm resistor 622 to ground 51. A return path, the purpose of which will be explained, is connected from ground 51 to the common-connected cathodes of SCR's 615, and consists of a parallel-connected diode 624 and 750-ohm resistor 625. Field coil 57 is shunted by a series connected 1.0-microfarad capacitor 627 and a 50-ohm resistor 628.

Each SCR 615 is gated in sequence in order to cause its phase of AC to be coupled through diode 620 to field coil 57, thereby supplying unidirectional field current from a three-phase AC source. The gating of SCR's 615 are controlled by pulse-forming means 630, one associated with each of the SCR's 615. Only the circuit for pulse-forming means 630' is shown in detail, it being understood that the circuits 630" and 630''' are identical therewith. Each pulse-forming means 630 has a bias input 632 connected with line 612, and a driving input 634 connected with a source of ramp-shaped driving waveform, such as available from lines 45 in FIG. 4. The output of each pulse-forming means 630 is a pulse which appears across a line 637 and a line 640 (common to all of the pulse-forming means) such lines are connected to the gating inputs of the SCR's 615. The circuits within pulse-forming means 630 are similar to the pulse-forming means 257 and 258 shown in FIG. 2, which in turn are similar to the pulse-forming means 23 and 24 shown in detail in our application Ser. No. 478,701.

Initially, as the motor runs below base speed, the signal on line 612 is approximately zero volts. As the driving waveforms 44 on lines 45 exceed the triggering level 127, (herein 0 volts) the pulse-forming means 630 is triggered into conduction, generating a pulse 139 to gate its corresponding SCR 615 into conduction, as generally shown in FIGS. 3a–d. The detailed operation of such pulse-forming means has been described before, and will not be repeated here. As the signal on line 612 increases above 0 volts, the firing point 129, FIG. 3c, is cut back to decrease the portion of AC voltage gated to coil 57. The resulting weakened field causes the motor to increase in speed.

Field control 500 thus operates in generally the same manner as field control 201 of FIGS. 1 and 2, except for the operation of the shaping network, and using a three-phase power source. Both field controls are similarly responsive to a bipolar input signal to gate an SCR by an amount determined by the absolute magnitude of the signal input. In prior circuits, a signal input of positive polarity would usually control one SCR, and a signal of the same absolute magnitude but of negative polarity would control an SCR poled in the opposite direction. Such operation occurs, for example, in applicants' armature control in FIGS. 1 and 4. However, the difference emitter follower circuit, FIG. 2, and the operational amplifier circuit, FIG. 5, are both responsive to the absolute magnitude of a signal, regardless of its polarity, to control the firing angle of the same SCR, or SCR's poled in similar directions.

Field control 500 includes a circuit which eliminates the undesirable effects of magnetic interaction between the armature and the field. The applicants have discovered that if the field control and the armature control are not compensated in a suitable manner, coupling between armature 12 and field coil 57 may result in a system operation which does not correspond to the commanded operation. This effect is illustrated in FIG. 8A, which shows voltage across the field coil 57, and FIG. 8B, which shows current through the armature 12 of the motor.

Without compensation, a particular SCR may pass a current pulse 650, FIG. 8B, at substantially the same time that the field control gates a voltage portion 652, FIG. 8A, to the field coil. The current pulse 650 creates a magnetic field which induces a voltage waveform 654 across the field coil. Voltage waveform 654 peaks and returns to zero as the current increases from zero to its maximum value, and then has an opposite polarity swing as the current goes through a negative half-cycle.

The commanded voltage across the field coil is the area, under curve 652, to the zero axis. However, the superimposed voltage 654 subtracts from the desired voltage during the positive half-cycle, and the resulting potential difference is the difference between curves 652 and 654. This subtraction can, at times, be compensated for by the negative half-cycle of voltage 654. However, as illustrated, the negative half-cycle may overlap in time the voltage 652 going to zero. This means that the SCR's in the field control are in a blocking state, so the negative half-cycle of voltage 654 does not result in generating additional current for the field. The net result is an actual field flux which does not correspond to the commanded amount of field flux.

The present control system eliminates the effects of armature-field magnetic interaction. Returning to FIG. 6, the resistor 622 develops a voltage thereacross proportional to the current through field coil 57. This voltage is coupled over a line 660 to a feedback circuit which controls the firing angle of SCR 615, so that the total current through field coil 57 equals the commanded current, which may not be produced due to the armature-field effect discussed above.

More particularly, line 660 is coupled through a 1.5-kilohm resistor 662 to a line 663 which is bypassed to ground 51 through a 1.0-microfarad capacitor 665. Line 663 is also connected through a 750-ohm resistor 667 to a −15 volts DC potential. The line 663 is directly connected to the junction of resistor 600 and potentiometer 602 in the bias input circuit for the pulse-forming means 630. In operation, a given command voltage on line 560 should produce a corresponding voltage drop across resistor 652. If the voltage drop varies from this value, due to the armature-field cancellation effect, the resulting decreased feedback voltage produces a net decrease in bias to pulse-forming means 630. As seen in FIG. 3c, this effectively lowers the bias level 127, advancing the firing angle of the SCR's 615, FIG. 6.

Due to the feedback circuit, armature-field interaction effects are divided by the ratio of the open-loop gain of the field control 500 divided by the closed-loop gain effective when the feedback line 660 is connected. For the disclosed circuit, this ratio is approximately 10, and thus reduces the interaction by an order of 10. The average net result is substantially the generation of the commanded amount of magnetic field flux.

Following the teachings of this invention, other means may be used to accomplish this result. For example, a time-synchronized control may be formed in which the three-phase voltage to the armature is displaced a fixed phase angle relative to the three-phase voltage for the field control. The amount of the phase angle is chosen to result in the pulses 650, FIG. 8B, being displaced out of time coincidence with the occurrence of the pulses 652, FIG. 8A. Since the resulting voltage 654 induced across the field coil would therefore not occur at a time when the field SCR's were firing, it would not affect the total current through the field coil.

Diode 620 in the field control, FIG. 6, is utilized to block reverse voltage should the armature-field interaction be great enough to produce a voltage which would flow back towards the SCR's 615. The diodes 620 and 624 form a current loop for field coil 57, so that the current produced by the field when collapsing can continue to flow and be dissipated. The resistor 625 forms an alternate parallel path for SCR's 615, when the diode 620 is blocked due to armature-field interaction. This allows current to flow from SCR's 615 and through resistor 625 to ground 51 (rather than the normal path through diode 620, field coil 57, and resistor 622 to ground 51). This alternate path allows the SCR's to continue to stay on, so that when the armature-field interaction voltage no longer reverse biases diode 620, the SCR's 615 will still be conducting and thus will be effective to pass current through coil 57.

FIELD CUTOFF CIRCUIT OF FIG. 5

In FIG. 5, the field cutoff circuit 503 for field control 500 is illustrated. Circuit 503 operates in generally the same manner as field cutoff circuit 203 in FIGS. 1 and 2. The back e.m.f. at terminal B is coupled through a 560-kilohm resistor 680, a 5-kilohm potentiometer 682, and a 10-kilohm resistor 684 to ground 51. The wiper on potentiometer 682 is nominally adjusted for 270 volts back e.m.f. The wiper is coupled to the bases of a NPN transistor 690 and a PNP transistor 692.

Transistor 690 is the input for a first stage of circuit 503. Its collector is connected through a 100-kilohm resistor 694 to a +15 volts DC. The collector is also connected directly to the base of a PNP transistor 696, the collector of which is directly connected to the base of a NPN transistor 697. The collector of transistor 697 is connected to +15 volts DC. The emitter is coupled to ground through a 1-kilohm resistor 700, and through a diode 702 to a line 704 which connects with line 560 from field control 500. Returning to transistor 690, its emitter is coupled to ground 51 through a 2.7-kilohm resistor 710. The emitter is also coupled through a 15-kilohm resistor 712 to the emitter of transistor 696, which in turn is coupled through a 27-kilohm resistor 714 to +15 volts DC.

Transistor 692 forms the input for a second stage, generally corresponding to the stage including transistor 690, but responsive to opposite polarity values of back e.m.f. The collector of transistor 692 is coupled through a 100-kilohm resistor 720 to −15 volts DC, and is also directly coupled to the base of a NPN transistor 722. The emitter of transistor 692 is coupled to ground 51 through a 2.7-kilohm resistor 724, and is coupled through a 15-kilohm resistor 726 to the emitter of transistor 722. The emitter of transistor 722 is also coupled through a 27-ohm resistor 730 to −15 volts DC. The collector of transistor 722 is coupled through a 27-kilohm resistor 732 to the base of a NPN transistor 734, whose emitter is directly connected to ground 51. The base of transistor 734 is also coupled through a 33-kilohm resistor 737 to +15 volts. The collector of transistor 734 is coupled through a diode 740 to line 704, and is also coupled through a 1-kilohm resistor 742 to +15 volts DC.

In operation, potentiometer 682 controls the switch point of operation for cutting off the field. Transistor 690 and its associated stage operates responsive to positive values of back e.m.f., while transistor 692 and its associated stage operates responsive to negative values of back e.m.f. When the positive back e.m.f. cutoff point is reached, transistor 690 is forward biased, reducing the voltage level at the base of transistor 696, and causing transistor 696 to go into conduction. The current flow is from the +15 volts, through transistor 696, to the base of the emitter follower transistor 697. With a positive potential at the base of the transistor 697, it conducts and allows current to flow through the diode 702 to line 704, and thence to line 560. The positive bias potential to the pulse forming means 630, FIG. 6, exceeds the peak point of the driving waveforms from terminal 45, thus preventing any pulses from being generated. This cuts off the SCR's 615 by failing to generate trigger pulses therefor. The field voltage will now collapse, and return the back e.m.f. to a nonexcessive level, at which time the transistor 690, FIG. 5, will no longer be biased into conduction, allowing the circuit 503 to return to its deenergized condition.

Transistor 692, FIG. 5, operates in a similar manner to that described for transistor 690, except it is responsive to negative values of back e.m.f. When the back e.m.f. exceeds the selected point, transistor 722 is driven into conduction, causing transistor 734 to be cutoff, and allowing +15 volts to pass through resistor 742 and diode 740 to line 704, thereby causing the same effect as previously described when diode 702 was forward biased. When the back e.m.f. reduces to a safe level, transistor 734 will again be biased into conduction, essentially grounding the anode of diode 740 and removing the large positive voltage from line 704.

ZERO CLAMP CIRCUIT

In FIG. 11, the zero clamp circuit 505 is illustrated in detail. Clamp 505 is responsive to the amplified error signal at terminal C to clamp terminal D for 300 milliseconds while the error signal attempts to go through zero and in the opposite direction from its prior polarity. The clamp allows the error signal to have its prior polarity, but prevents the signal from dropping below approximately 0 volts. The fixed time delay insures that during deceleration of the motor, the opposite direction SCR's will not be energized at a time which would probably result in a phase fault in the power section.

Circuit 505 includes a bipolar inverting switch 750 for producing a voltage on a line 751 which is the inverse of the error signal at terminal C (and hence the inverse of the error signal at terminal D). Terminal C is coupled through a pair of 10-kilohm resistors 753 and 754 to a pair of complementary transistors 757 and 758, whose emitters are coupled directly to ground 51. The base and collector of transistor 757, type NPN, are individually coupled through a 330-kilohm resistor 760 and a 10-kilohm resistor 762, respectively, to +15 volts DC. Similarly, the base and collector of transistor 758, type PNP, are individually coupled through a 330-kilohm resistor 764 and a 10-kilohm resistor 765 to −15 volts, respectively. The collector of transistor 757 is coupled through a 5.1-kilohm resistor 770 to line 751, and the collector of transistor 758 is coupled through a 5.1-kilohm resistor 772 to line 751.

When terminal C is of positive polarity, for example, transistor 757 is biased further into conduction and transistor 758 biased into a relatively nonconducting condition. This tends to connect ground potential through the conducting transistor to the junction of resistor 762 and 770, thereby shifting the junction of resistor 770 and 772 more towards the −15 volts potential, producing a negative output on line 751.

Line 751 is coupled to a stage 780 responsive to negative signals on line 751, and a stage 781 responsive to positive signals on line 751. Stages 780 and 781 are identical, except that the stages use complementary transistors and opposite polarity DC sources in corresponding locations, and that the diodes are poled in opposite directions. Only stage 780 will be described in detail, it being understood that stage 781 operates in an identical manner for opposite polarity signals on line 751.

Stage 780 includes a PNP transistor 785 having a base coupled to line 751. The emitter is coupled through a 15-kilohm resistor 787 to ground 51, and also is coupled through a 15-kilohm resistor 788 and a 680-ohm resistor 789 to −15 volts DC. The junction between resistor 788 and 789 is coupled to the emitter of a NPN transistor 791, the base of which is directly connected to the collector of transistor 785, and through a 15-kilohm resistor 793 to −15 volts DC. The collector of transistor 791 is coupled through a 56-kilohm resistor 800 to the base of a PNP transistor 802. A 270-kilohm resistor 804 is also coupled from the collector of transistor 791 to the base of transistor 785. A 5.0-microfarad capacitor 807 is coupled from the collector of transistor 791 to ground 51. The emitter of transistor 802 is coupled through a diode 810 to ground 51, and through a 1-kilohm resistor 812 to +15 volts DC. A 440-kilohm resistor 814 also couples +15 volts DC to the base of transistor 802.

Assuming that the error signal at terminal C is positive, the voltage at line 751 will be negative, driving transistor 785 into conduction. This reduces its collector voltage, and drives transistor 791 into conduction. Conducting transistor 791 connects −15 volts potential through resistor 789 to its collector, charging capacitor 807 to a negative potential and also applying a negative potential to the base of transistor 802. The emitter of transistor 802 is connected to a fixed positive potential of approximately +0.6 volts DC, corresponding to the voltage drop across diode 810 (due to the current flow path from +15 volts DC to ground 51 through resistor 812 and diode 810). The collector of transistor 802 is connected through a diode 820 to terminal D. At this time, terminal D is positive, hence diode 820 is blocked and no conductive path is formed from the emitter to the collector of transistor 802.

It will now be assumed that the control signal source 28, FIG. 4, has changed the error signal from a positive to a negative potential, such as caused when the command signal ceases and the tachometer connected to the motor armature 12 is still generating the same value of potential, thus indicating that the motor is to decelerate rapidly. The potential at terminal A, and hence also at terminals C and D, goes in a negative direction and crosses the zero axis. At this time, transistor 802 is forward biased across its emitter-collector junction, and becomes conductive for 300 milliseconds, as controlled by the time constant formed by resistor 814, resistor 800, and capacitor 807. The conducting transistor 802, through diode 820, clamps terminal D at −0.2 volts potential until the time constant times out, causing transistor 802 to be driven nonconductive and hence allowing the potential at terminal D to go more negative.

More particularly, as the potential at terminal D crosses the zero axis and goes to about −0.2 volts DC, diode 820 is biased in a forward direction, causing current to flow from the emitter of transistor 802 (at +0.6 volts) and out through its collector (a 0.2 voltage drop) and diode 820 (a 0.6 voltage drop) to terminal D. This slight negative potential is maintained at junction D regardless of how negative junction C is driven. During this same time, the negative potential at terminal C causes line 751 to be driven positive. This switches transistors 785 and 791 to a nonconductive state, removing −15 volts from the collector of transistor 791. The negative potential across capacitor 807 now is dissipated through the resistance in the circuit, and in approximately 300 milliseconds, the junction of resistors 800 and 814 goes positive, turning transistor 802 off and thus terminating the current path through diode 820. Terminal D now goes to the negative potential which it otherwise would have assumed.

During the same time, stage 781 is driven into its operative mode. This causes the output transistor in stage 781, corresponding to output transistor 802 in stage 780, to have its emitter-base junction forward biased. However, its collector-emitter junction is not forward biased because the clamping diode, corresponding to diode 720, is reversed biased. Thus, the zero clamp circuit 505 is now preconditioned for a negative potential at terminals C and D. When the error signal should attempt to change and go in a positive direction, the before described operation will repeat, except that stage 781 will control. After 300 milliseconds, the junction D which will be clamped at approximately 0 volts will be released. Circuit 505 is thus bipolar and prevents any quiescent error signal from changing to an opposite polarity for at least a predetermined time delay.

DECELERATION CLAMP

In FIG. 11, the deceleration clamp circuit 507 is illustrated in detail. This circuit is adjustable to control the firing angle of the armature SCR's by clamping junction D in the 50- to 250-millivolt region, preventing the firing angle from being advanced until the back e.m.f. drops below a selectable absolute value limit. The clamping action of clamps 505 and 507 produces the same general type operation as was produced by the phase back circuit in our previous application, Ser. No. 586,426.

The deceleration clamp 507 prevents the firing angle from being advanced until the level of back e.m.f., such as indicated by line 331 in FIG. 3a, drops below a selected limit value. Since the firing angle was retarded, the area 335 which represents the power passed to the motor armature has been reduced. The overall effect is similar to that previously produced by the phase back circuit, in that opposite power pulses of smaller amplitude than would be otherwise produced are gated to the motor armature, thereby preventing violent deceleration of the motor.

Returning to FIG. 11, terminal B is coupled through a 68-kilohm resistor 830, a 3-kilohm potentiometer 832, and a 470-ohm resistor 834 to ground 51. The wiper of potentiometer 832 is connected to a stage 836 effective for positive values of back e.m.f., and a stage 838 effective for negative values of back e.m.f. The wiper of potentiometer 832 is nominally adjusted so that 120 volts or more of back e.m.f., of either polarity, will activate the corresponding stage 836 or 838 until the absolute magnitude of back e.m.f. drops below the selected amount. Only the circuit for stage 836 will be explained in detail, since the circuits forming stages 836 and 838 are identical, except that the transistors are of complementary types, the diodes are poled in the opposite direction and the polarities of the DC supplies are opposite.

The wiper of potentiometer 832 is coupled through a 5.6-kilohm resistor 850 to the base of a NPN transistor 852. The base is bypassed to ground 51 through the paralleled combination of a 7.5-kilohm resistor 854 and a 25.0-microfarad capacitor 856. The base is also coupled to −15 volts DC through a 150-kilohm resistor 858. The collector of transistor 852 is coupled through a diode 860 to a line 862 which connects with terminal B. The emitter of transistor 852 is connected to a network for selecting from 0.0 to −0.6 volts DC. This network consists of a 2.7-kilohm resistor 866 and a diode 868 connected in series between −15 volts DC and ground 51. Across diode 868 is a 100-ohm potentiometer 870, the wiper of which is directly connected to the emitter of transistor 852. The diode 868 has a 0.6 voltage drop thereacross, so that adjustment of the wiper of potentiometer 870 selects from 0.0 to −0.6 volts which is applied to the emitter of transistor 852. This in turn determines the voltage at which the line 862 is clamped.

In operation, it will be assumed that the back e.m.f. at terminal B rises above +120 volts DC. This positive potential is sufficient to overcome the negative bias at the base of transistor 852, from the voltage-dividing resistors 858 and 854, forward-biasing transistor 852. Assuming that the zero clamp circuit 505 is turned off, allowing the signal at junction B to go positive, a current path from terminal D to ground 51 is formed via line 862, diode 860, the collector to emitter of transistor 852, and through the resistance of potentiometer 870.

If the wiper of potentiometer 870 is fully counterclockwise, the signal at junction D can go to +0.8 volts, corresponding to the voltage drops across diode 860 and the collector-emitter junction of transistor 852. As the wiper is turned clockwise, the resulting voltage is subtracted from the voltage drops, until at the maximum clockwise position, the line 862 is clamped at substantially 0.2 volts.

When the back e.m.f. drops below +120 volts DC, transistor 852 is back biased, and a delay is established by the RC network consisting of resistors 858 and 854, and capacitor 856. This gradually allows the signal at junction D to absolutely increase from the clamped point to the value it would otherwise assume without the operation of the clamp circuit. Thus, the deceleration clamp 507 is effective after the zero clamp 505 has released terminal D, and the control signal is approaching its new value. The operation of stage 838 is essentially identical with stage 836, except that the stage is effective for negative values of back e.m.f. in excess of the amount selected by adjustment of the wiper on potentiometer 832.

SCR SAFETY CIRCUIT

In FIG. 4, a safety circuit including stages 510, pulsers 512, and bias sources 514 is illustrated for preventing the occurrence of a "rollover" condition. In certain instances, the gated armature SCR's 26 or 27 may fail to become nonconductive during the occurrence of peak AC voltage. As a result, the SCR will remain conductive when another SCR is fired, creating a fault condition.

This fault condition may be better understood by reference to FIGS. 9 and 10, which illustrates two firing conditions for one phase 17''' of armature voltage. The voltage spikes 905, produced by the safety circuit, should be disregarded for the discussions of how a rollover condition can occur. For small firing angles Φ, FIG. 9, there is no problem deenergizing a fired SCR, since once the voltage 17''' drops below the level 331 of back e.m.f., the SCR is strongly back biased. However, when the angle Φ is large, FIG. 10, a "rollover" condition may occur. The SCR for the illustrated case is forward biased by the difference between the back e.m.f. level 331 and the lesser amplitude level of voltage 17'''. As the voltage 17''' rises above the back e.m.f. level 331, as occurs at point 900, the conductive SCR should turn off. Several conditions may prevent the SCR from immediately turning off. As is apparent in FIG. 10, if the SCR should still be conductive at point 902, when voltage 17''' drops below the back e.m.f. level 331, then that SCR will remain conductive until voltage 17''' again rises above the back e.m.f. level 331. This causes a fault condition to occur.

Examples of instances which may cause the SCR to remain conductive from point 900 to point 902, and thus create a "rollover" condition, are a large inductive load (which will occur for certain motor armatures), a back e.m.f. level 331 which is close to the peak value of voltage 17''' (the voltage difference is insufficient to generate the current necessary for turnoff), and an overheated SCR junction.

In accordance with applicants' invention, a voltage spike 905 of large amplitude is superimposed in a manner sufficient to create a voltage difference across the SCR which insures that the SCR will turn off. This spike 905 can either be subtracted from the back e.m.f. level, or can add to the transformer voltage. Preferably, the spike subtracts, as is illustrated, since it is difficult to pull transformer voltage up. The voltage spike 905, which produces a voltage difference across the SCR which exceeds that possible from the peak amplitude of gated AC waveform, which is the time at which the SCR should be rendered nonconductive. It will be seen that in FIG. 9, the spike 905 has no affect on turn off of the SCR, because the firing angle Φ is less than 90°. However, this is immaterial since the "rollover" condition could not occur in this instance.

The safety circuit which generates the large voltage spike 905 is illustrated in FIG. 4. Each stage 510 consists of a pair of SCR's 910 and 912, connected in parallel and poled in opposite directions. SCR 910 can be fired by applying a pulse across its terminals 914, while SCR 912 can be fired by applying a voltage across its terminals 916. One junction point of the parallel connected SCR's is connected through a capacitor 920, such as 1.0 microfarads, to junction B, which is connected to one side of motor armature 12. The junction between capacitor 920 and the SCR's 910 and 912 is coupled to ground 51 through a 15-kilohm resistor 922. The opposite junction point of the SCR's 910 and 912 is coupled to the last preceding terminal 11 of the three-phase voltage source 10.

In order to control the firing of SCR's 910 and 912, pulsers 512 generate pulses which occur at approximately the 90° point of the half-cycle of AC which is gated through the armature SCR's. Pulsers 512 consist of reverse pulsers 930 coupled to terminals 914 of the corresponding SCR's 910, and forward pulsers 932 coupled to terminals 916 of the corresponding SCR's 912. Reverse pulsers 930 may use the same circuit as reverse pulse forming means 24, FIG. 1, as disclosed in detail in our application Ser. No. 478,701, which is the same as the pulse-forming means 257 in FIG. 2 of the present application. Similarly, the circuit of the forward pulsers 932 may be the same as for the forward pulse forming means 23, FIG. 1, which is the same as the pulse forming means 258 in FIG. 2 of this application.

To control the point of firing of the SCR's 910 and 912, fixed bias source 514 is utilized to set the firing points at or near the 90° point for each phase of the three-phase source. Source 514 consists of a reverse fixed bias source 935, having output lines 936 coupled to each of the reverse pulsers 930, and a forward fixed bias source 939, having output lines 940 coupled to each of the forward pulsers 932. Reverse fixed bias source 935 may take the same form as the reverse bias source 33 in FIG. 1, and forward fixed bias source 939 may take the same form as the forward bias source 32 in FIG. 1, with the variable potentiometers in those circuits (see our prior-identified applications) being located at a fixed point generating the same absolute magnitude of voltage on the lines 936 and 940. Pulsers 930 and 932 are connected to the driving waveforms available on lines 45, in the same manner as the forward and reverse pulse forming means 23 and 24.

In operation, the fixed bias sources 935 and 939 are adjusted so as to generate a level of DC voltage, corresponding to levels 127 and 128 in FIG. 3c, which crosses the driving waveforms 44 at points 129 which are at or near the 90° point of the waveforms 17. A variation of 10° or so from the 90° point is not critical. As previously explained for pulse-forming means 23 and 24, this causes pulses to be generated which occur at or near the 90° point for each of the three phases of AC from the power source.

The levels of voltages 127 and 128 are chosen to be the same absolute magnitude, but opposite polarities, so that pulses are coupled to SCR's 910 and 912 for both the positive and negative peaks of the AC waveform.

Returning to FIG. 4, when one of the SCR's is fired, and is forward biased across its anode to cathode junction, it passes the voltage across capacitor 920 which subtracts from the back e.m.f. level at the armature 12 to create the negative going voltage spike 905, FIGS. 9 and 10. It will be apparent that although the SCR 910 and 912 is gated on for 90°, the only voltage effect occurs when the SCR is first fired, due to the series connection of the capacitor 920. Thus, each stage 510 is effective to produce a composite voltage difference which is greater than the voltage difference otherwise available from the normal three-phase SCR gating circuit, to prevent the occurrence of a "rollover" condition.

We claim:

1. A control circuit for a pair of parallel-connected controlled unidirectional conduction devices poled in opposite directions, comprising: a source of AC waveform having oppositely going portions, coupled to said parallel connected devices; a source of signal having a condition which indicates the period of time said devices should be energized; a reference conductor; means coupled to said source of signal and having a pair of output signals of equal absolute magnitude with respect to said reference conductor and of opposite polarity, said means being responsive to a change in said condition to vary the absolute magnitude of said signals by the same absolute amount; and a pair of energizing means responsive to said pair of signals for energizing said devices for a period of time proportional to the absolute magnitude of said signals, causing said devices to pass similar parts of the oppositely going portions of said AC waveform.

2. The circuit of claim 1 wherein said means having a pair of output signals includes first and second transistors, each having first and second output electrodes and a control electrode, a pair of equal impedance means connected in series between output electrodes on said first and second transistors, the junction of said pair of impedance means corresponding to said reference conductor, and means coupling said control electrodes to said signal source.

3. A control circuit for a gatable conduction device, comprising:
  a source of AC waveform having oppositely going portions, coupled to said device;
  a source of bipolar signal having positive and negative amplitudes with respect to a reference level;
  generating means coupled to said bipolar source for generating a gating signal occurring at the same phase angle with respect to said AC waveform for both positive and negative bipolar signals having equal absolute amplitudes, each different absolute amplitude of said bipolar signal causing signal generation at a different phase angle; and
  means coupling said gatable device to said generating means to cause said device to pass identical portions of said AC waveform for both positive and negative bipolar signals having equal absolute amplitudes.

4. The control circuit of claim 3 wherein said generating means includes converting means coupled to said bipolar source for generating a unidirectional signal of only one polarity and having an amplitude corresponding to the absolute amplitude of said bipolar signal, and means generating said gating signal at a phase angle with respect to said AC waveform corresponding to the amplitude of said unidirectional signal.

5. The control circuit of claim 4 wherein said converting means includes at least a first and a second unidirectional conduction device, a pair of circuit paths having a common junction connected to said bipolar source, one of said paths including said first device poled in one direction and the other of said paths including said second device poled in an opposite direction to said one direction, and means coupled to said pair of paths and responsive to the occurrence of a signal therein for generating said firing signal.

6. The control circuit of claim 5 wherein said means connected to said dual path includes first and second transistors, each transistor having first and second output electrodes and a control electrode, a pair of equal impedance means connected in series between the output electrodes on said first and second transistors, and means coupled across one of said pair of impedance means for developing said firing signal having an absolute amplitude with respect to the potential at the junction of said pair of impedance means corresponding to the absolute amplitude of said bipolar signal.

7. The control circuit of claim 5 wherein said converting means includes an operational amplifier having an output and a pair of inputs, one input producing an inversion of the signal at said output and the other input producing no inversion of the signal at said output, and means connecting said pair of paths to said pair of inputs of said operational amplifier, whereby said output has an absolute amplitude corresponding to the amplitude of said bipolar signal.

8. The control circuit of claim 3 including a plurality of gatable conduction device, said generating means generates a plurality of gating signals having different phase relations with respect to each other, each gating signal occurring at the same phase angle with respect to said AC waveform for both positive and negative bipolar signals having equal absolute amplitudes, and said coupling means individually couples each gating signal to the corresponding gatable conduction device to cause all of said plurality of gatable devices to pass similar portions of said AC waveform for both positive and negative bipolar signals having equal absolute amplitudes.

9. The control circuit of claim 8 wherein said plurality of gatable devices comprise a pair of parallel connected gatable unidirectional conduction devices poled in opposite directions, whereby said gatable devices pass similar parts of the oppositely going portions of said AC waveform.

10. The control circuit of claim 8 wherein said plurality of gatable devices comprise three gatable unidirectional conduction devices, said source of said AC waveform comprising a three-phase AC source having three phases of waveforms each displaced 120° from the others, means individually coupling each phase of said AC source to a corresponding one of said plurality of gatable devices, and means connecting all of said gatable devices to a single load for passing three-phase DC therethrough in a common direction, each of said gatable devices passing similar portions of said AC waveform for both positive and negative bipolar signals having equal absolute amplitudes.

11. A control circuit for a gatable conductive device, comprising:
  a source of AC waveform having alternately positive and negative portions, each portion having a peak amplitude;
  control means connecting said device to said AC source for passing portions of said AC waveform when energized and for blocking said AC waveform when deenergized; and
  means for superimposing a waveform of short duration with respect to a cycle of said AC waveform to produce a composite waveform having an amplitude which changes said peak amplitude.

12. The control circuit of claim 11 wherein said gatable conduction device comprises a unidirectional conduction device poled to pass one of said alternately positive and negative portions, and said composite waveform having a polarity which tends to deenergize said unidirectional conduction device.

13. The control circuit of claim 12 wherein said superimposing means includes a second unidirectional conduction device, and means including a capacitor for connecting said second device across said first-named unidirectional conduction device.

14. The control circuit of claim 13 wherein said superimposing means includes means for generating a firing signal repetitively occuring near the time of peak amplitude of said AC waveform, and means coupling said firing signal to said second unidirectional device for energizing said device to generate said short-duration waveform.

15. The control circuit of claim 11 wherein said superimposing means includes synchronizing means coupled to said AC source for causing said short-duration waveform to repetitively occur near the time of peak amplitude of said AC waveform.

16. The control circuit of claim 15 wherein said superimposing means repetitively causes said short duration waveform to be generated near phase angles of said AC waveform which are odd multiples of 90°.

17. The control circuit of claim 11 including a DC motor having an armature coil and a source of field, said armature coil having a back e.m.f. thereacross when the armature is rotating and cutting said field, said control means connecting said device between said AC source and said armature coil for passing when energized portions of said AC waveform to said armature coil to prevent rollover of said gatable device when said back e.m.f. has an amplitude which approaches said peak amplitude.

18. The control circuit of claim 17 wherein said gatable device comprises a first unidirectional conduction device poled to pass one of said AC portions to said armature coil to cause said motor to rotate in one direction, a second unidirectional conduction device in parallel with said first device and poled to pass the opposite portion of said AC waveform to said armature coil to cause said motor to rotate in an opposite direction, said control means selectively energizing either said first device or said second device to cause said motor to rotate in a desired direction, and said superimposing means including a first section effective when said first device is being energized for superimposing a short-duration waveform to produce a composite waveform across said first device having an absolute voltage difference which exceeds that produced by the passed AC waveform and a second section effective when said second device is energized for generating a short-duration waveform to produce a composite waveform across said second device having an absolute voltage difference which exceeds that produced by the passed AC waveform.

19. The control circuit of claim 11 for a pair of parallel-connected gatable devices, each device comprising a unidirectional conduction device poled in an opposite direction to the other device, wherein said control means connects said first and second device to said AC source to cause said first device to pass positive portions of said AC waveform when energized and to cause said second device to pass negative portions of said AC waveform when energized, and said superimposing means is effective when said first device is energized to generate a short duration waveform of positive polarity and effective when said second device is energized to generate a short duration waveform of negative polarity.

20. A control circuit for a motor having an armature and a field coil, comprising:
  a source of signal indicating an amount of power to be gated to said armature and a value of field current for said field coil;
  a source of AC power;
  armature-gating means coupled between said armature and said power source and responsive to said signal for periodically gating power to said armature, said gated power generating a magnetic flux which cuts said field coil to produce an induced voltage thereacross;
  field-gating means coupled between said field coil and said power source and responsive to said signal for energizing said field coil to control the field voltage thereacross, said induced voltage and said field voltage producing an undesirable resulting field current different than the field current indicated by said signal; and
  means for cancelling the effect of magnetic interaction which produces said undesirable resulting field current, comprising means coupled to said field-gating means for maintaining said field current at the value indicated by said signal.

21. The control circuit of claim 20 wherein said cancelling means includes means for generating a voltage representative of the field current, and feedback means coupled between said generating means and said field-gating means for superimposing said voltage with said signal to modify the field voltage across said field coil.

22. The control circuit of claim 21 wherein said generating means includes resistive means, and means DC coupling said resistive means to said field coil for causing at least a portion of said field current to pass through said resistive means.

23. The control circuit of claim 21 wherein said field-gating means includes pulse-actuated gating means coupled between said field coil and said power source to periodically gate power to said field coil, pulse-generating means responsive to the amplitude of voltage at an input to vary the time of generation of pulses at an output coupled to said pulse-actuated gating means, means including an electrical path connected to said input for coupling a voltage to said input representing the value of current indicated by said signal, and means for connecting said feedback means to said electrical path to combine said feedback voltage with said signal-representing voltage.

24. The control circuit of claim 23 including a source of reference potential, means coupling said field coil between said pulse-actuated gating means and said reference source for causing gated power to flow through said field coil, and an alternate current path coupled between said pulse-actuated gating means and said reference source.

25. The control circuit of claim 24 wherein said alternate path included means for shunting said field coil to dissipate collapsing magnetic flux from said field coil.

26. The control circuit of claim 20 wherein said power source includes a three-phase AC power having three terminals, each terminal having energy with a power waveform displaced 120° from the power waveform at the other terminals, said field-gating means includes three gatable conduction devices, and means coupling each device between a different one of said terminals and said field coil for separately gating the power waveform associated therewith to said field coil under control of said signal, the gated three-phase AC waveform producing said field current.

27. The control circuit of claim 26 wherein said cancelling means is effective to control the firing angle of said three-gating means.

28. The control means of claim 27 wherein said cancelling means includes means coupled to said field coil for generating a voltage proportional to the field current, and said control means includes feedback means responsive to said field representative voltage for modifying the firing angle of said three gating means.

29. A control circuit for a motor having an armature and a field coil, comprising:
  a source of signals having amplitudes related to the speed of rotation of said motor;
  armature control means coupled to said signal source for energizing said armature; and
  field control means for energizing said field coil, including
  shaping means coupled to said signal source for generating a voltage which is nonlinear with respect to the amplitude of said signals, and
  means coupled to said shaping means for energizing said field coil in direct proportion to said nonlinear voltage.

30. The control circuit of claim 29 wherein said shaping means includes a plurality of stages each actuated by a different amplitude of said signal, each stage including means effective when said stage is actuated for changing the slope of said voltage generated by said shaping means.

31. The control circuit of claim 30 wherein said shaping means includes means coupled to said signal source for generating a command voltage proportional to the amplitude of said signal, means for translating said command voltage to said field coil energizing means, each of said stages including gatable resistance means coupled to said translating means for changing the resistance of said translating means when said stage is actuated.

32. The control circuit of claim 31 including a source of reference potential common to said signal source and said field control means, each stage including means coupling said gatable resistance in shunt between said translating means and said reference source and semiconductor means responsive when energized to couple the resistance means in shunt between said translating means and said reference source.

33. The control circuit of claim 32 wherein said shaping means includes an electrical path independent of said translating means for coupling said command voltage from said command voltage means to each of said semiconductor means in said stages.

34. The control circuit of claim 30 wherein each of said stages includes adjustment means for changing the slope of the voltage controlled thereby when the stage is actuated.

35. The control circuit of claim 29 wherein said signal source includes an error signal source generating an error signal having an amplitude indicating the desired speed of rotation of said motor, and a tachometer source coupled to said motor for generating a signal having an amplitude indicating the actual speed of rotation of said motor, means coupling said error source to said armature control means, and means coupling said tachometer source to said shaping means.

36. The control circuit of claim 35 wherein said nonlinear voltage approximately matches the field characteristic of said field coil.

37. A control circuit for a motor, comprising:
a source of signal having an amplitude representing a desired speed for the motor;
control means for controlling the speed of said motor in response to the amplitude of a signal;
translating means coupled between said signal source and said control means for translating said speed-representing signal to said control means;
clamping means coupled to said translating means and responsive when energized for clamping said signal at a minimum amplitude; and
energizing means coupled to said signal source for energizing said clamping means in response to a predetermined condition of said signal.

38. The control circuit of claim 37 wherein said energizing means includes time delay means responsive to a change in said predetermined condition to maintain said clamping means energized for a predetermined time duration, the lapse of said time duration deenergizing said clamping means.

39. The control circuit of claim 37 wherein said signal source has a bipolar signal having both positive and negative amplitudes with the absolute amplitude representing the desired speed for the motor and the polarity indicating the direction of rotation of the motor, said control means also controlling the direction of rotation of said motor in response to the polarity of the signal coupled thereto, and said clamping means being responsive when energized for clamping said signal at a minimum magnitude corresponding to approximately the crossover region between positive and negative amplitudes.

40. The control circuit of claim 39 wherein said energizing means includes memory means set in accordance with the polarity of said bipolar signal, means responsive to said memory means for energizing said clamping means, and means coupled to said signal source and said memory means for deenergizing said clamping means when said bipolar signal has a different polarity than the polarity in said memory means, whereby said predetermined condition is a change of polarity of said signal.

41. The control circuit of claim 40 wherein said means responsive to said memory means includes capacitor means charged by said memory means, said energizing means being responsive to a predetermined amount of charge on said capacitor means for energizing said clamping means, and resistive means coupled to said capacitor means for discharging said capacitor means when said memory means changes state in response to a change in polarity of said bipolar signal.

42. The control circuit of claim 39 wherein said clamping means includes a source of reference potential, and semiconductor means coupled between said reference source and said translating means and poled so that said minimum amplitude corresponds to said reference potential minus the forward voltage drop across said semiconductor means.

43. In a control system for a motor having an armature and including a source of control signal having an amplitude which represents a desired motor speed, a control circuit, comprising:
armature control means coupled to said signal source and responsive to said control signal for impressing across said armature a range of voltages;
clamping means coupled to said armature control means and including a plurality of stages each effective when energized for clamping said control signal at a minimum amplitude; and
means for selectively energizing said plurality of stages to modify the operation of said armature control means and impress voltages across said armature which do not correspond to the voltages which would be impressed if said control signal was not clamped.

44. The control circuit of claim 43 including means developing a voltage proportional to the speed of rotation of said motor, said selectively energizing means including means coupled to said voltage-developing means for energizing one of said plurality of stages when said voltage exceeds a predetermined value.

45. The control circuit of claim 44 wherein said voltage-developing means includes said motor and said voltage is the back e.m.f. generated by the motor when rotating.

46. The control circuit of claim 43 wherein said selectively energizing means includes means coupled to said signal source for controlling energization of one of said stages in response to a predetermined condition related to said control signal.

47. The control circuit of claim 46 wherein said signal source has bipolar control signals with positive and negative amplitudes, the absolute amplitude representing the desired motor speed and the polarity representing the desired direction of rotation of the motor, and said one stage energizing means is responsive to a change in the polarity of said bipolar signal to energize said one stage, whereby said predetermined condition corresponds to a change in polarity of said control signal.

48. The control circuit of claim 43 wherein said selectively energizing means includes first means for deenergizing one of said stages when said first means is deactuated and second means for deenergizing a second of said stages when said second means is deactuated, said first means including means coupled to said motor for deactuating said first means when the back e.m.f. across said motor drops below a predetermined level, said second means includes means coupled to said signal source for deactuating said second means when the absolute amplitude of said control signal drops to substantially zero amplitude.

49. The control circuit of claim 43 wherein at least one of said plurality of stages in said clamping means includes time delay means effective when the stage is energized for deenergizing the stage after the lapse of a predetermined time period.

50. The control circuit of claim 43 wherein said plurality of stages are each effective when energized for clamping said control signal at different minimum amplitudes.

51. The control circuit of claim 50 wherein said signal source has a bipolar control signal having positive and negative amplitudes in which the absolute amplitude represents the desired motor speed and the polarity represents the desired motor direction, one of said stages being effective to clamp said control signal at a minimum amplitude substantially corresponding to the crossover point between said positive and negative polarity.

52. The control circuit of claim 50 wherein said signal source has a bipolar control signal having positive and negative amplitudes with the absolute amplitude representing a desired motor speed and the polarity indicating the desired motor direction, at least one of said stages including means selectively energizable for clamping said control signal at a positive minimum amplitude and at a negative minimum amplitude, the absolute values of said positive minimum amplitude and said negative minimum amplitude being substantially equal.

53. The control circuit of claim 52 wherein said selectively energizing means includes control means having a first and a second state, one state causing said last-named stage to clamp on a positive minimum amplitude and the other state causing said last-named stage to clamp on a minimum negative amplitude, and means coupled to said bipolar signal source for controlling the state of said control means in accordance with the polarity of said control signal.

54. A control circuit for a motor, comprising:
a source of bipolar signal having positive and negative amplitudes, the polarity of the signal representing the desired direction of rotation for the motor;
control means coupled to said source for controlling the operation of said motor in response to the amplitude and polarity of said signal;

means having a first section responsive when energized for clamping said signal at a minimum positive amplitude and a second section responsive when energized for clamping said signal at a minimum negative amplitude; and means for selectively energizing the first or second section of said clamping means.

55. The control circuit of claim 54 wherein said minimum positive amplitude and said minimum negative amplitude have substantially equal absolute values, whereby said clamping means produces similar control of said motor when operating in either direction of rotation.

56. The control circuit of claim 55 wherein said first and second sections of said clamping means each includes semiconductor means and means for coupling said semiconductor means to said signal source for causing said minimum amplitude to be maintained by the voltage drop across the semiconductor means, said semiconductor means being poled in opposite directions in said first and second sections, and means connecting said coupling means to said selectively energizing means.